United States Patent
Akao et al.

(10) Patent No.: US 7,948,590 B2
(45) Date of Patent: May 24, 2011

(54) RETARDATION SUBSTRATE, SEMI-TRANSPARENT LIQUID CRYSTAL DISPLAY, AND METHOD FOR MANUFACTURING RETARDATION SUBSTRATE

(75) Inventors: Sosuke Akao, Tokyo (JP); Kazuhiro Osato, Tokyo (JP); Hironobu Suda, Tokyo (JP); Yuji Kubo, Tokyo (JP); Godai Fukunaga, Tokyo (JP); Yuki Yasu, Tokyo (JP); Takao Taguchi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 12/923,617

(22) Filed: Sep. 29, 2010

(65) Prior Publication Data

US 2011/0025954 A1    Feb. 3, 2011

Related U.S. Application Data

(63) Continuation of application No. PCT/JP2008/073463, filed on Dec. 24, 2008.

(30) Foreign Application Priority Data

Mar. 31, 2008  (JP) ................. 2008-092308
Aug. 13, 2008  (JP) ................. 2008-208556

(51) Int. Cl.
*G02F 1/1335* (2006.01)
(52) U.S. Cl. .................... 349/114; 349/127; 349/113
(58) Field of Classification Search .............. None
See application file for complete search history.

(56) References Cited

U.S. PATENT DOCUMENTS

| | | | | |
|---|---|---|---|---|
| 5,825,445 | A * | 10/1998 | Okamoto et al. | 349/118 |
| 6,215,538 | B1 * | 4/2001 | Narutaki et al. | 349/106 |
| 2001/0055082 | A1 * | 12/2001 | Kubo et al. | 349/114 |
| 2002/0126238 | A1 | 9/2002 | Matsushita et al. | |
| 2003/0007112 | A1 | 1/2003 | Matsushita et al. | |
| 2007/0046864 | A1 * | 3/2007 | Maruyama et al. | 349/96 |

FOREIGN PATENT DOCUMENTS

| | | |
|---|---|---|
| JP | 2-20825 | 1/1990 |
| JP | 2004-4494 | 1/2004 |
| JP | 2005-24919 | 1/2005 |
| JP | 2006-338055 | 12/2006 |

(Continued)

OTHER PUBLICATIONS

International Search Report for PCT/JP2008/073463, mailed Mar. 31, 2009.

(Continued)

*Primary Examiner* — Lucy P Chien

(57) ABSTRACT

A retardation substrate is provided, which includes a substrate and an optically anisotropic solidified liquid crystal layer which is supported by the substrate and formed as a continuous film made from a same material. The solidified liquid crystal layer comprises first to third regions each having two sub-regions which are a sub-region A and a sub-region B, an in-plane birefringence of the 1A sub-region is larger than that of the 2A sub-region, the in-plane birefringence of the 3A sub-region is smaller than that of the 2A sub-region, and an in-plane birefringence of the 1B sub-region is the same as that of the 3B sub-region, smaller than that of the 1A sub-region and larger than that of the 3A sub-region.

24 Claims, 13 Drawing Sheets

FOREIGN PATENT DOCUMENTS

| | | |
|---|---|---|
| JP | 2007-47832 | 2/2007 |
| JP | 2007-47833 | 2/2007 |
| JP | 2008-116731 | 5/2008 |
| JP | 2008-225437 | 9/2008 |
| JP | 2009-86062 | 4/2009 |

OTHER PUBLICATIONS

Japanese Office Action issued Jul. 21, 2009 in corresponding Japanese Patent Application 2009-521037.

Japanese First Notice of Reasons for Rejection, mailed Jul. 21, 2009 in the Japanese Application No. 2009-521037, which is related to the present above-identified US application (2 pages) (English translation including Statement of Accuracy of Translation, 4 pages).

Japanese Final Notice of Reasons for Rejection, mailed Mar. 16, 2010 in the Japanese Application No. 2009-521037, which is related to the present above-identified US application (2 pages) (English translation including Statement of Accuracy of Translation 3 pages).

* cited by examiner

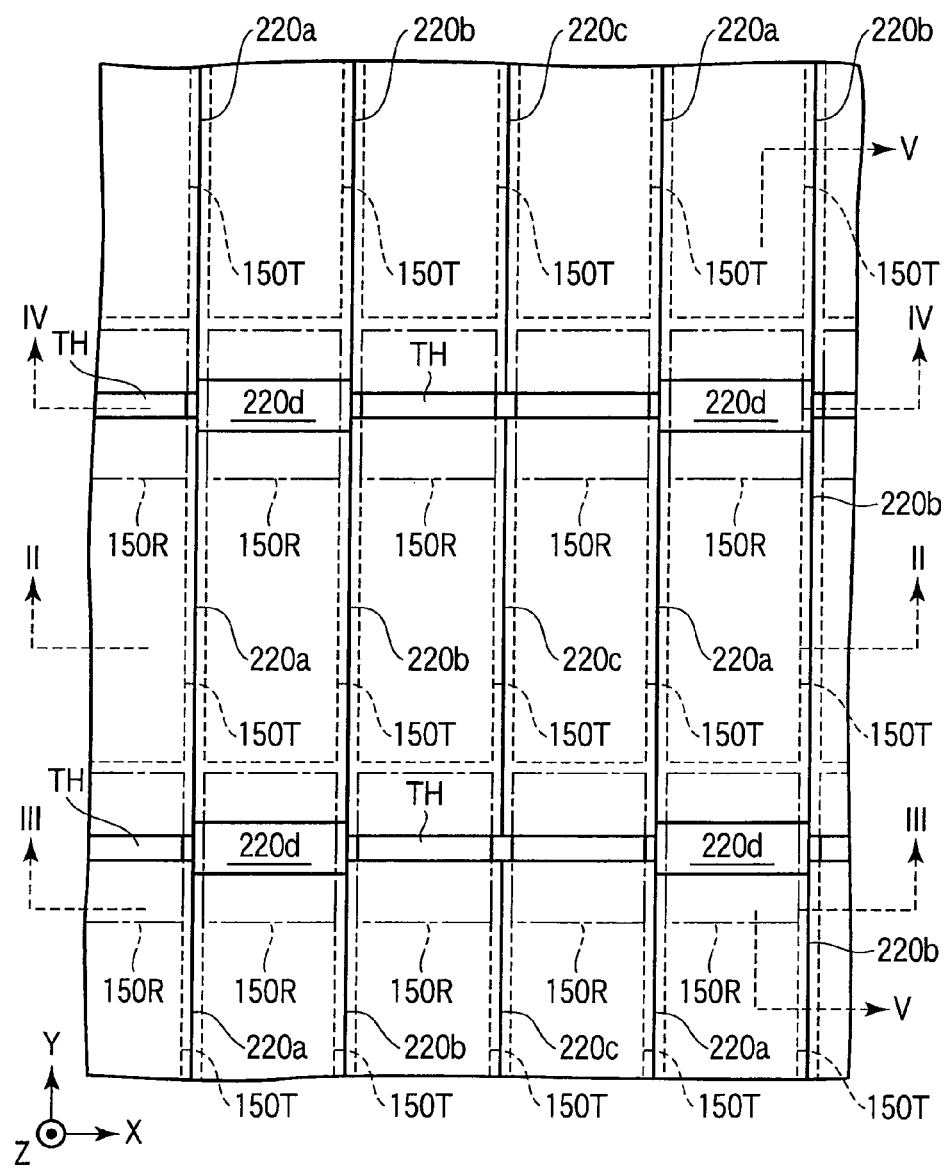
F I G. 1

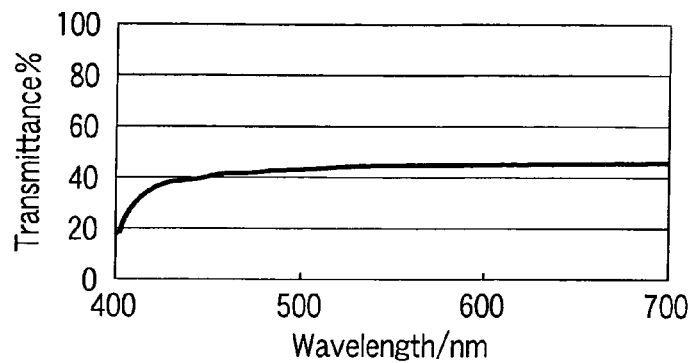
F I G. 9
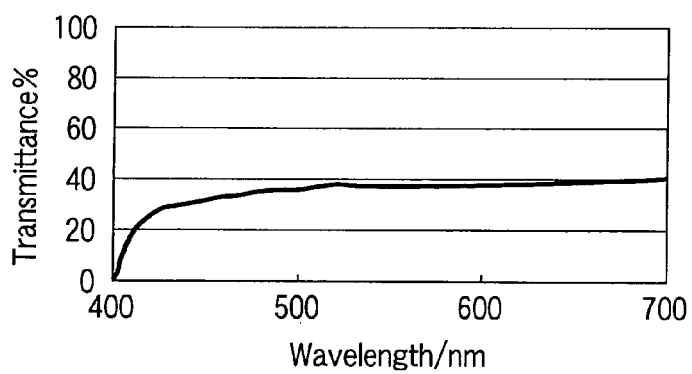
F I G. 10
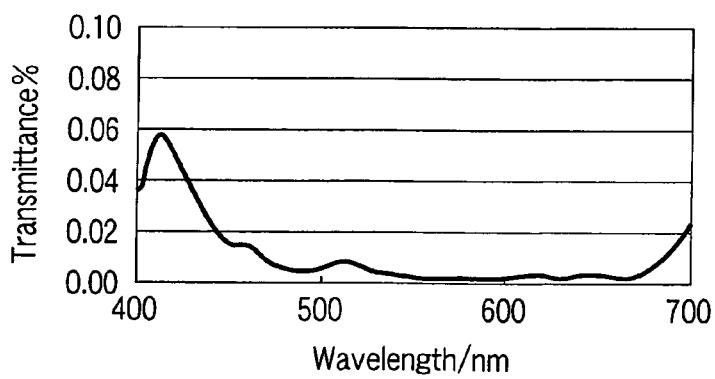
F I G. 11

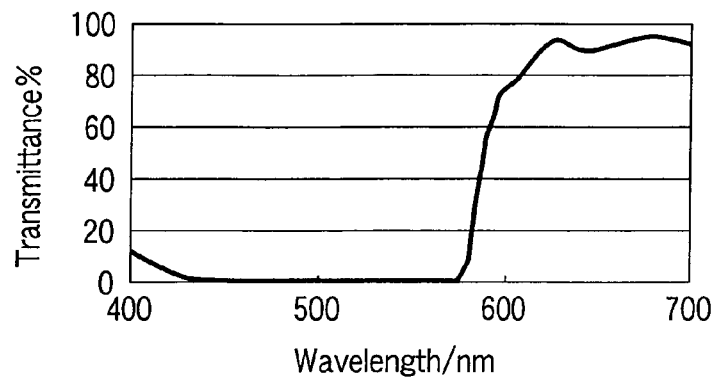
F I G. 12
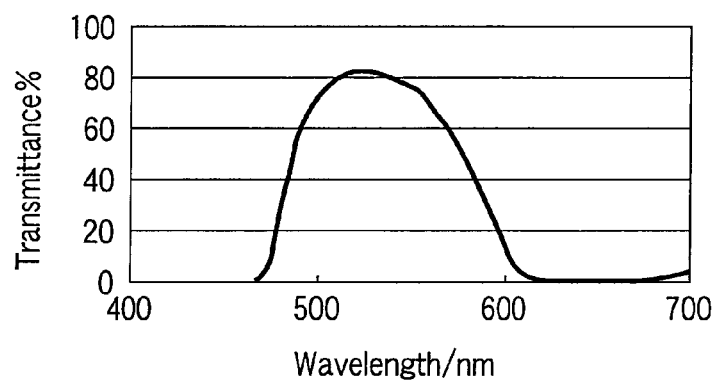
F I G. 13
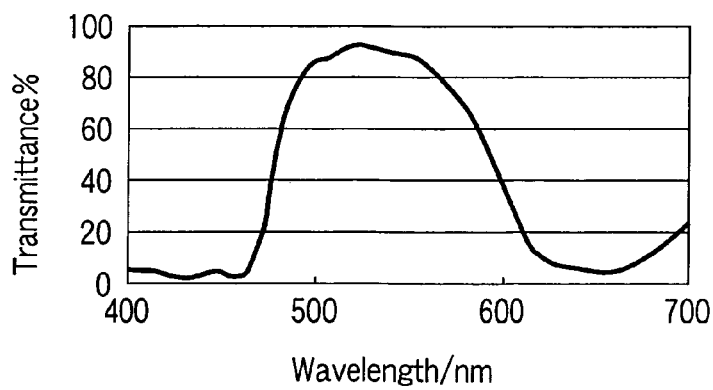
F I G. 14

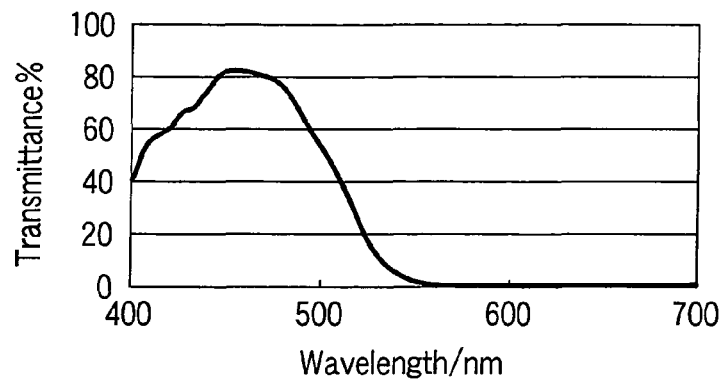
F I G. 15
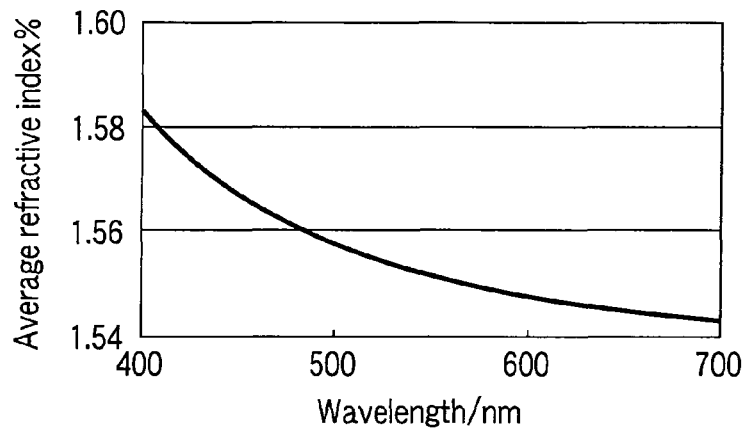
F I G. 16
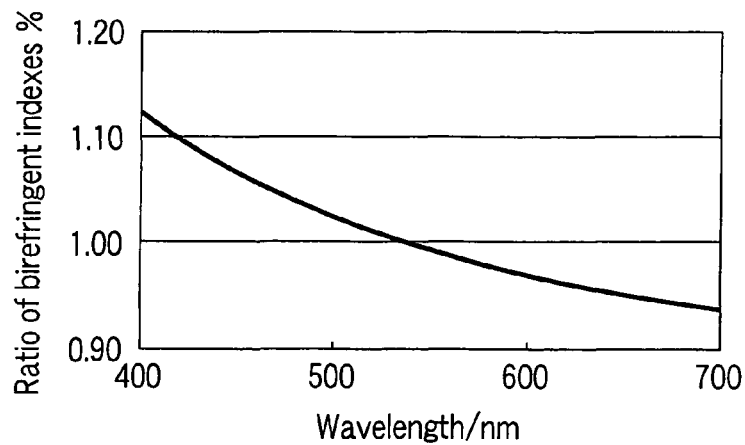
F I G. 17

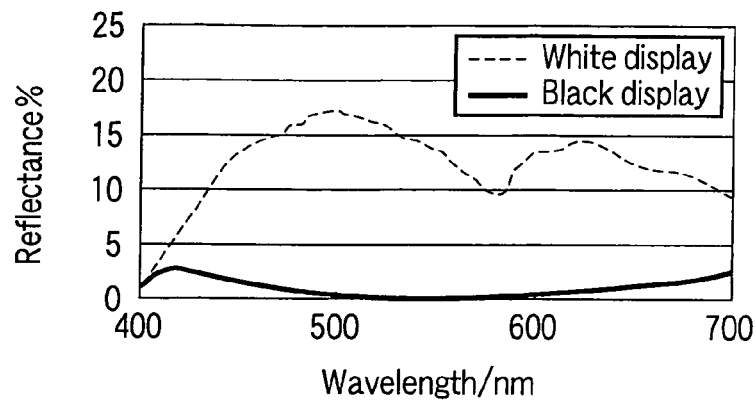
F I G. 18
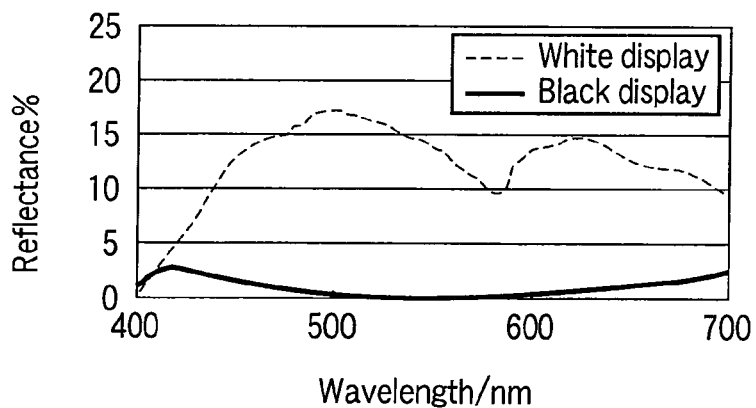
F I G. 19
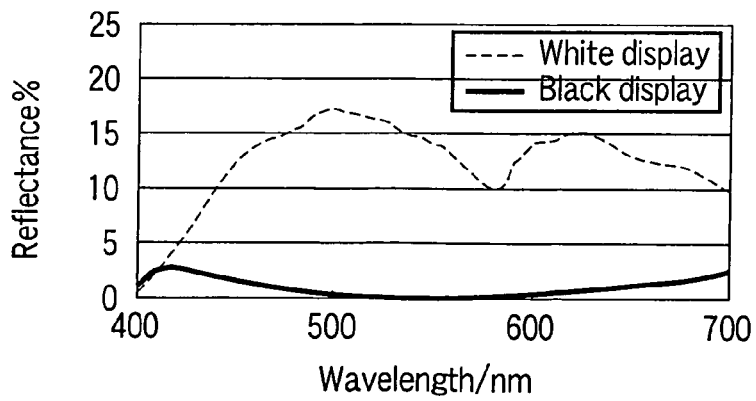
F I G. 20

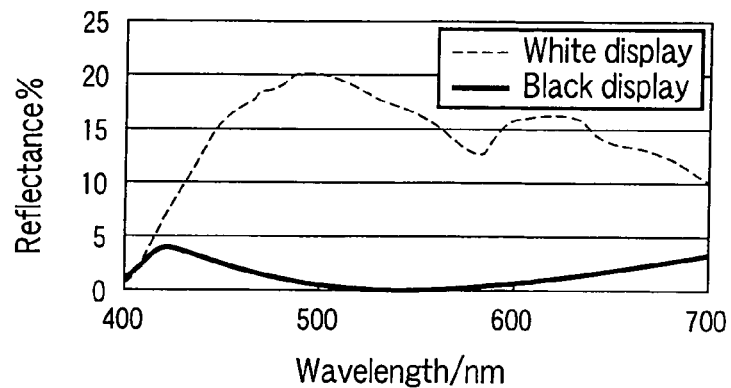
F I G. 21
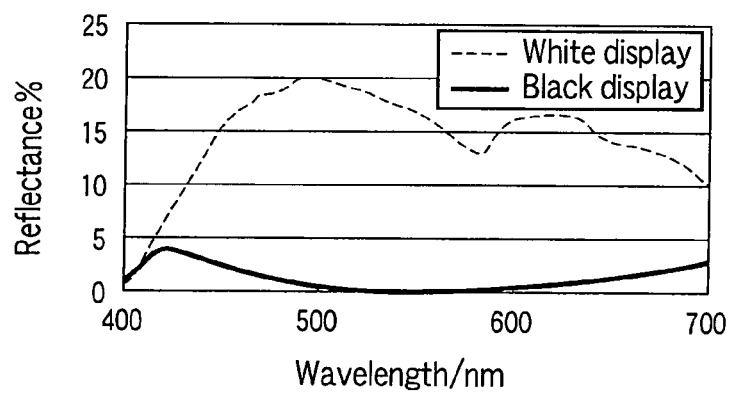
F I G. 22
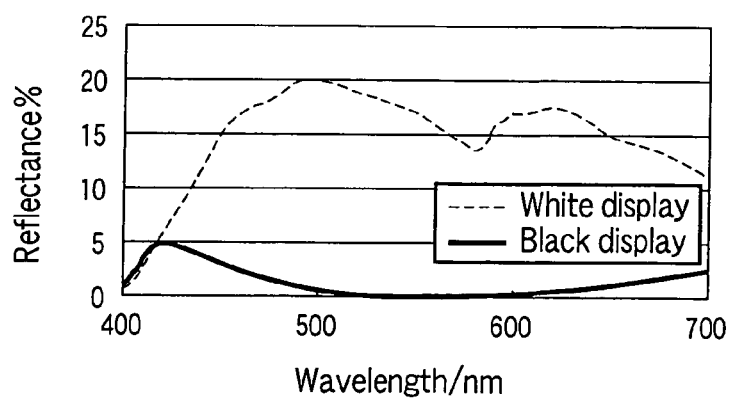
F I G. 23

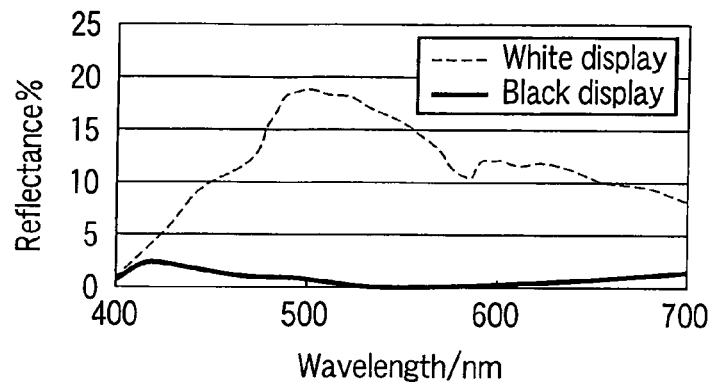
F I G. 24
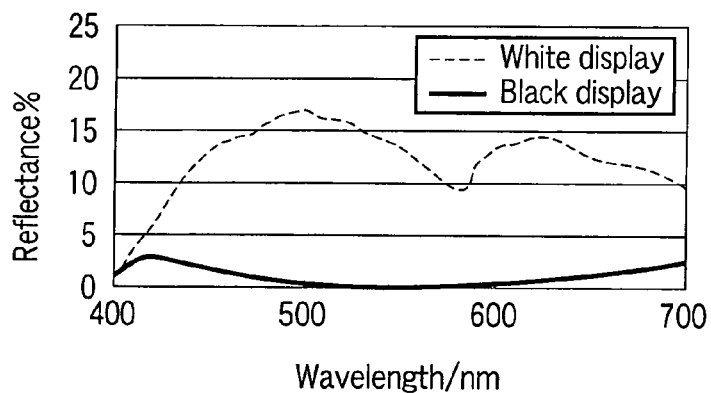
F I G. 25
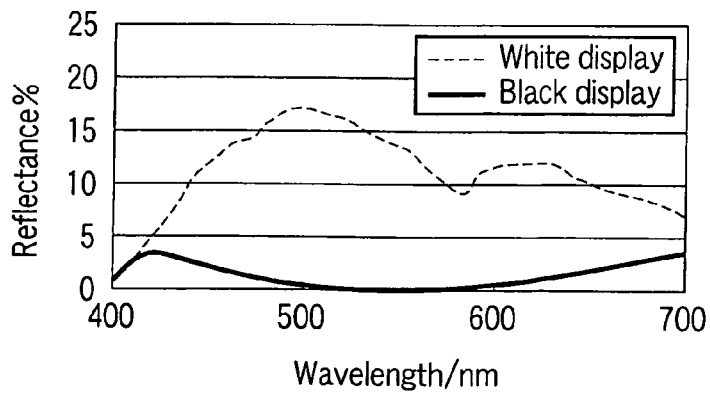
F I G. 26

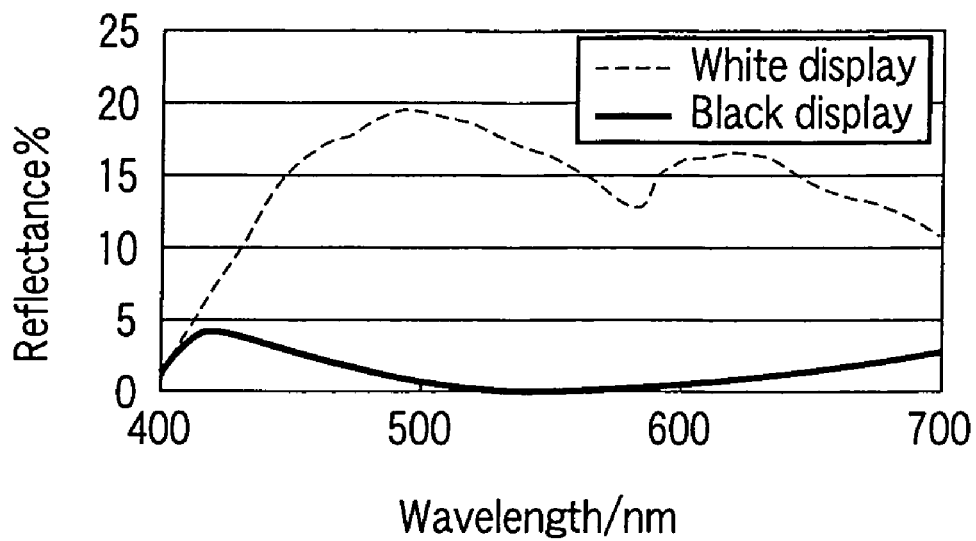
F I G. 27
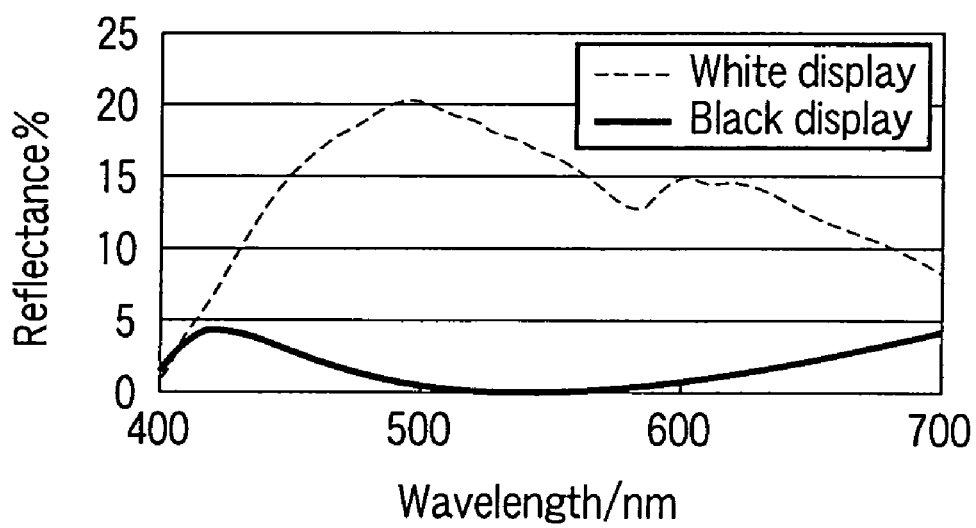
F I G. 28

RETARDATION SUBSTRATE, SEMI-TRANSPARENT LIQUID CRYSTAL DISPLAY, AND METHOD FOR MANUFACTURING RETARDATION SUBSTRATE

CROSS REFERENCE TO RELATED APPLICATIONS

This is a Continuation Application of PCT Application No. PCT/JP2008/073463, filed Dec. 24, 2008, which was published under PCT Article 21(2) in Japanese.

This application is based upon and claims the benefit of priority from prior Japanese Patent Applications No. 2008-092308, filed Mar. 31, 2008; and No. 2008-208556, filed Aug. 13, 2008, the entire contents of both of which are incorporated herein by reference.

BACKGROUND OF THE INVENTION

1. Field of the Invention

The present invention relates to optical technique that can be applied to a semi-transparent liquid crystal display.

2. Description of the Related Art

Liquid crystal displays have characteristics of thin-shaped, lightweight and low power consumption. Thus, in recent years, their application to mobile devices and stationary equipments such as television receivers increases rapidly.

Some liquid crystal displays, for example, those mounted on mobile devices are desired to attain high visibility not only in interior lighting environments and dark places but also under high-luminance light source such as sun. Semi-transparent liquid crystal displays are those which fit such demands and are mounted in many mobile devices.

In such a semi-transparent liquid crystal display, each pixel contains a transmissive display area and a reflective display area. In the transmissive display area, a transparent conductive layer is used as the back electrode whereas in the reflective display area, a layer of metal or alloy is used as a part of the back electrode. Also, in the transmissive display area, light which is transmitted once through the coloring layer of a color filter is utilized for display whereas in the reflective display area, light which is transmitted twice through the coloring layer of a color filter is utilized for display. Therefore, the reflective display area is provided with a coloring layer having a higher transmittance than that of the transmissive display area. Because the semi-transparent liquid crystal display adopts such a structure, a multicolor image can be displayed by both the transmissive and reflective systems.

In the semi-transparent liquid crystal display, wavelength plates such as a quarter-wave plate are used. For example, there is the case where a retardation film as a quarter-wave plate is disposed between the liquid crystal cell and the front side polarizing plate and a retardation film as a quarter-wave plate is further disposed between the liquid crystal cell and the backside polarizing plate. However, when two quarter-wave plates are used, there is the case where an avoidable variation in the characteristics of these quarter-wave plates leads to a drop in the contrast ratio to be attained by transmissive display.

In relation to such a problem, JP-A 2004-4494 describes that a patterned retardation layer is disposed inside of a liquid crystal cell instead of placing a retardation film on the liquid crystal cell. Specifically, a retardation layer made of a polymer liquid crystal and an optional organic insulation layer are disposed only in the reflective display area to reduce the cell gap in the reflective display area with respect to that in the transmissive display area. This allows a structure that does not include a quarter-wave plate in the transmissive display area and therefore, transmissive display having a high contrast ratio is attained.

However, the liquid crystal display described in JP-A 2004-4494 also has a problem concerning reflective display. This problem resides in the point that although red, green and blue pixels are different in the wavelength range of the display color, the retardation layer of the reflective section has the same characteristics for each color and it is therefore difficult to adopt an optimum design for all pixels differing in display color.

Specifically, when a quarter-wave plate by which quarter wavelength ($\lambda/4$) is obtained at the center wavelength of the green wavelength range, for example, about 550 nm is used, a retardation larger than $\lambda/4$ is obtained in the blue wavelength range having a center wavelength of about 450 nm, even if it is supposed that the refractive index anisotropy of this quarter-wave plate, that is, birefringence $\Delta n$ is almost the same throughout the entire visible range. Then, a retardation smaller than $\lambda/4$ is obtained in the red wavelength range having a center wavelength of about 630 nm. Actually, in many optical materials, the birefringence is larger in the shorter wavelength side, that is, in the blue wavelength range and is smaller in the longer wavelength side, that is, in the red wavelength range, so that this problem is sometimes more serious.

Also, JP-A 2005-24919 describes that a retardation layer is disposed inside of a liquid crystal cell instead of placing a retardation film on the liquid crystal cell. A retardation suitable to each color pattern is obtained by changing the thickness of the retardation layer correspondingly to red, green and blue patterns. This is attained by forming a color filter layer which is to be the base of the retardation layer, such that red, green and blue color filter layers, have different thicknesses, which allows the retardation layer subsequently applied to have different thickness is correspondingly the colors. This makes it possible to obtain a retardation layer having optimized retardations which vary depending on colors.

However, in the method described in JP-A 2005-24919, it is necessary to vary the thickness of the color filter layer correspondingly to the color of patterned layers, and also, the color filter is limited in its design. This is caused by the fact that in each pixel of the semi-transparent liquid crystal display, the coloring layer of the reflective display area is required to have a higher transmittance than the coloring layer of the transmissive display area. This will be described with reference to the structure of the color filters for each of the reflective display area and transmissive display area.

Such a difference in transmittance can be produced, for example, by using, in the coloring layer of the transmissive display area, a material different from that used in the coloring layer of the reflective display area. In this case, it is necessary to form red, green and blue coloring layers for the transmissive display area and red, green and blue coloring layers for the reflective display area. Namely, in the case of adopting this method, the process of forming the color filter layer is complicated. Also, a larger number of materials are required.

Alternatively, it is possible that the same material is used for the coloring layer of the transmissive display area and coloring layer of the reflective display area in each pixel and the coloring layer of the transmissive display area is made to be thicker than the coloring layer of the reflective display area, to produce the aforementioned difference in transmittance. However, it is highly difficult to strictly control both the thickness of the coloring layer in the transmissive display area and thickness of the coloring layer in the reflective display area as compared with the case of strictly controlling the thickness of the coloring layer having a uniform thickness.

The aforementioned difference in transmittance can be produced by adopting in each pixel the same structure in the coloring layer of the reflective display area and in the coloring layer of the transmissive display area except that throughholes are formed in the coloring layer of the reflective display area. According to this method, the color filter layer can be formed more easily.

If it is intended to use the method described in JP-A 2005-024919, the structure in which through-holes are formed in the coloring layer of the reflective display area cannot be adopted. The retardation layer is formed in the reflective display area on the premise that the wavelength of transmitted light differs for each color and the retardation value is designed according to this. Because white light passes as-is at the through-hole section where no coloring layer exists, the contrast in reflective display is rather lowered since the retardation value is adjusted according to each color.

BRIEF SUMMARY OF THE INVENTION

An object of the present invention is to attain a semitransparent crystal display which can be produced by a simplified method and has excellent display performance.

According to a first aspect of the present invention, there is provided a retardation substrate comprising a substrate; and an optically anisotropic solidified liquid crystal layer which is supported by the substrate and formed as a continuous film made from a same material, wherein the solidified liquid crystal layer comprises first to third regions each having two sub-regions which are a sub-region A and a sub-region B, an in-plane birefringence of the 1A sub-region is larger than that of the 2A sub-region, an in-plane birefringence of the 3A sub-region is smaller than that of the 2A sub-region, and an in-plane birefringence of the 1B sub-region is the same as that of the 3B sub-region, smaller than that of the 1A sub-region and larger than that of the 3A sub-region.

According to a second aspect of the present invention, there is provided a semi-transparent liquid crystal display comprising the aforementioned retardation substrate.

According to a third aspect of the present invention, there is provided a method for manufacturing a retardation substrate, comprising forming a solidified liquid crystal layer on a substrate, forming the solidified liquid crystal layer comprising a film-forming step of forming a liquid crystal material layer comprising a photo-polymerizing or photo-crosslinking thermotropic liquid crystal compound, mesogens of the thermotropic liquid crystal compound forming an orientated structure;

an exposure step of exposing at least two regions of the liquid crystal material layer to light at different exposure values to form a 1A sub-region comprising a polymerization or crosslinkage product of the thermotropic liquid crystal compound, a 2A sub-region comprising the polymerization or crosslinkage product and the thermotropic liquid crystal compound as an unreacted compound, wherein a polymerization or crosslinkage product content of the 2A sub-region is lower than that of the 1A sub-region, a 3A sub-region comprising the unreacted compound wherein a polymerization or crosslinkage product content of the 3A sub-region is lower than that of the 2A sub-region, and 1B to 3B regions comprising the unreacted compound wherein polymerization or crosslinkage product contents of the 1B to 3B regions are lower than that of the 1A sub-region and higher than that of the 3A sub-region;

thereafter, a developing step of heating the liquid crystal material layer to a temperature equal to or higher than a phase transition temperature at which the thermotropic liquid crystal compound changes from a liquid crystal phase to an isotropic phase to lower degree of orientation of the mesogens in at least the 2A, 3A, and 1B to 3B regions; and a fixing step of polymerizing and/or crosslinking the unreacted compound while maintaining a low level of orientation.

BRIEF DESCRIPTION OF THE SEVERAL VIEWS OF THE DRAWING

FIG. 1 is a plan view schematically illustrating a liquid crystal display according to an embodiment of the present invention.

FIG. 9 is a graph illustrating the spectral transmittance of a polarizing plate used for optical calculation.

FIG. 10 is a graph illustrating the spectral transmittance of a polarizing plate used for optical calculation.

FIG. 11 is a graph illustrating the spectral transmittance of a polarizing plate used for optical calculation.

FIG. 12 is a graph illustrating the spectral transmittance of a color filter used for optical calculation.

FIG. 13 is a graph illustrating the spectral transmittance of a color filter used for optical calculation.

FIG. 14 is a graph illustrating the spectral transmittance of a color filter used for optical calculation.

FIG. 15 is a graph illustrating the spectral transmittance of a color filter used for optical calculation.

FIG. 16 is a graph illustrating the average refractive index of a retardation layer used for optical calculation.

FIG. 17 is a graph illustrating the birefringence of a retardation layer used for optical calculation.

FIG. 18 is a graph illustrating the reflectance in a simulation No. 1.

FIG. 19 is a graph illustrating the reflectance in a simulation No. 2.

FIG. 20 is a graph illustrating the reflectance in a simulation No. 3.

FIG. 21 is a graph illustrating the reflectance in a simulation No. 4.

FIG. 22 is a graph illustrating the reflectance in a simulation No. 5.

FIG. 23 is a graph illustrating the reflectance in a simulation No. 6.

FIG. 24 is a graph illustrating the reflectance in a simulation No. 7.

FIG. 25 is a graph illustrating the reflectance in a simulation No. 8.

FIG. 26 is a graph illustrating the reflectance in a simulation No. 9.

FIG. 27 is a graph illustrating the reflectance in a simulation No. 10.

FIG. 28 is a graph illustrating the reflectance in a simulation No. 11.

DETAILED DESCRIPTION OF THE INVENTION

Figure 2:
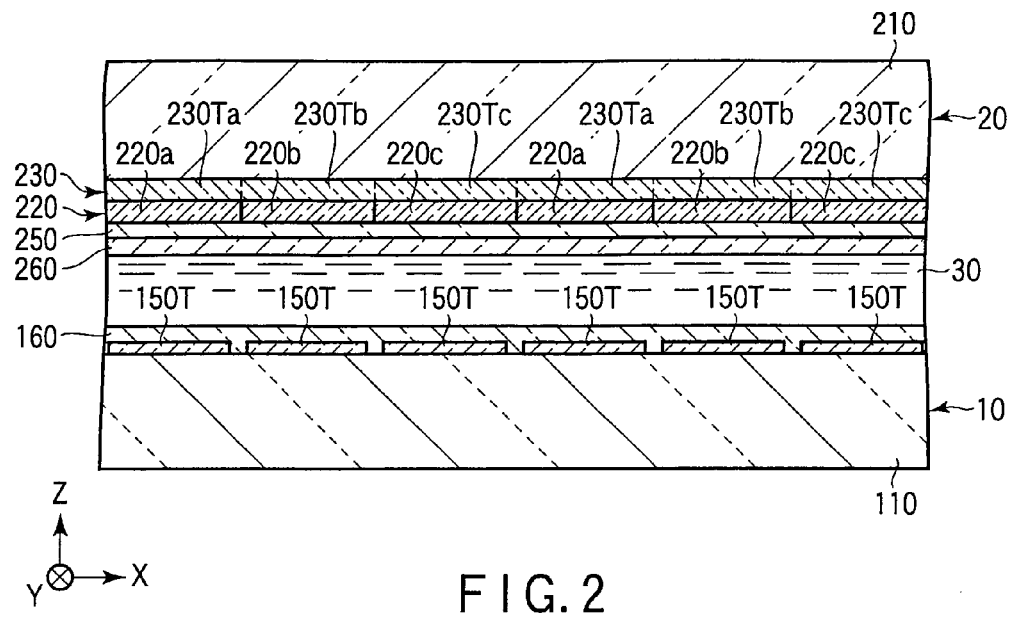
FIG. 2 is a sectional view taken along the line II-II in the liquid crystal display shown in FIG. 1.

An embodiment of the present invention will be described below with reference to the accompanying drawings. Note that the same reference numerals in the drawings denote components that achieve the same or similar functions, and a repetitive explanation thereof will be omitted.

Figure 3:
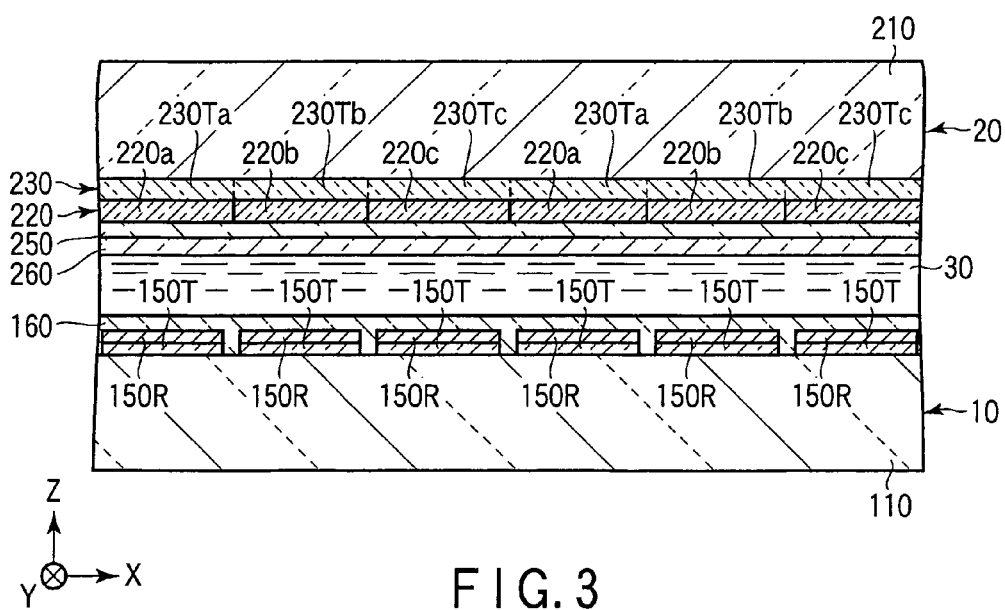
FIG. 3 is a sectional view taken along the line III-III in the liquid crystal display shown in FIG. 1.
Figure 4:
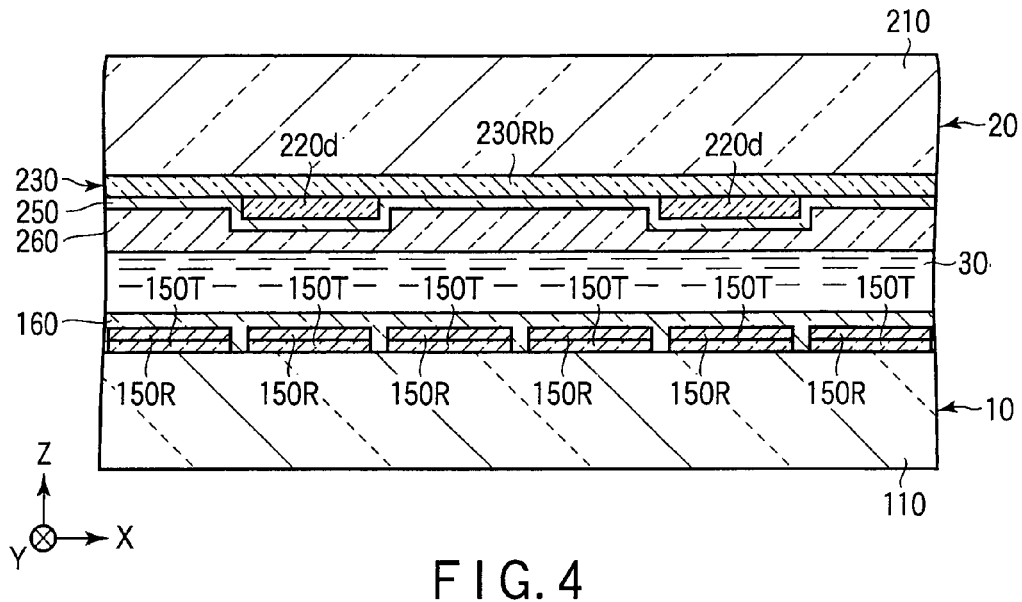
FIG. 4 is a sectional view taken along the line IV-IV in the liquid crystal display shown in FIG. 1.
Figure 5:
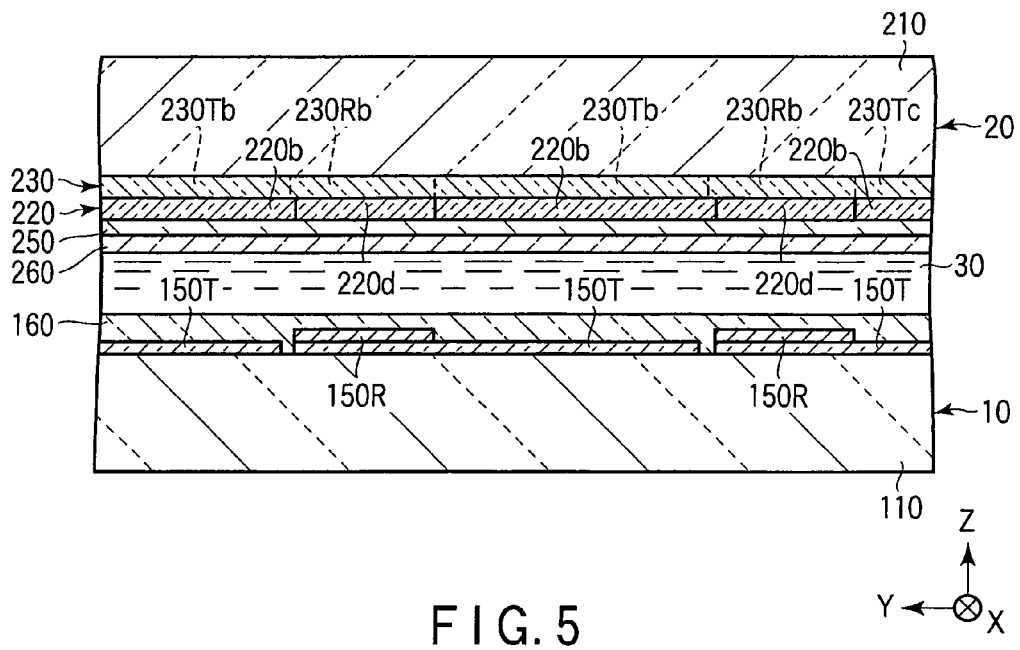
FIG. 5 is a sectional view taken along the line V-V in the liquid crystal display shown in FIG. 1.
Figure 6:
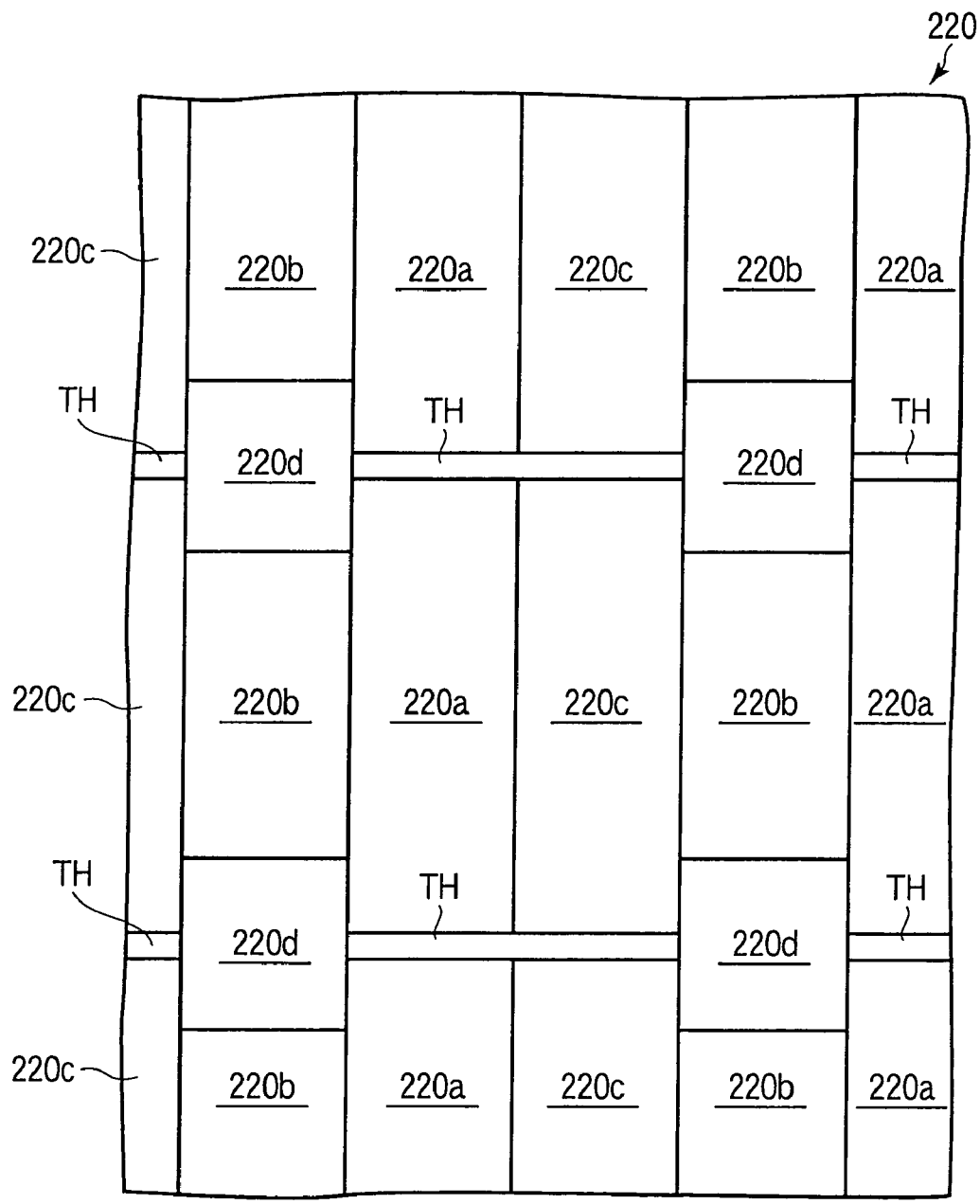
FIG. 6 is a plan view schematically illustrating a color filter including the liquid crystal display shown in FIGS. 1 to 5.
Figure 6:
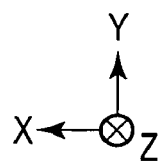
Figure 7:
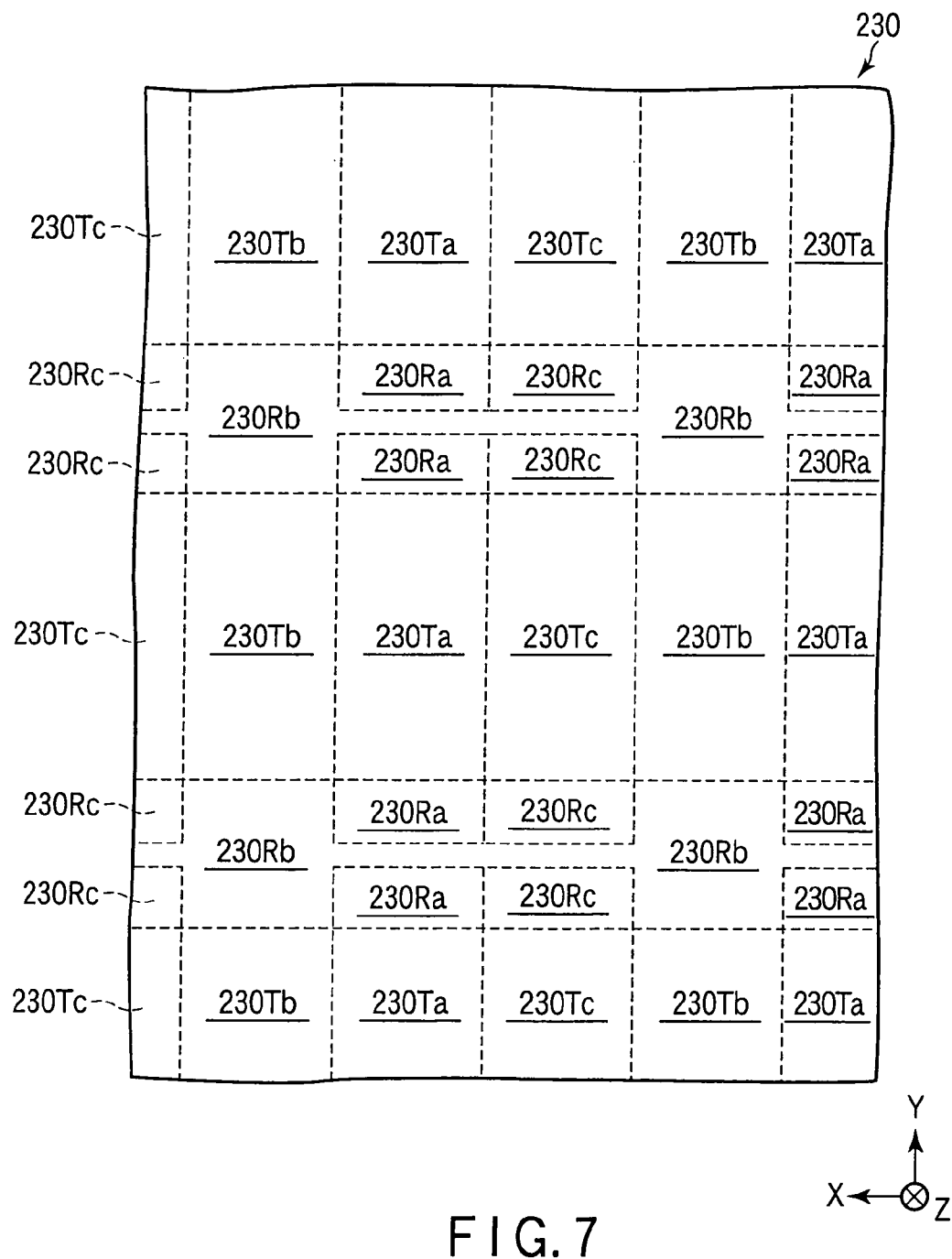
FIG. 7 is a plan view schematically illustrating a solidified liquid crystal layer included in the liquid crystal display shown in FIGS. 1 to 5.

FIG. 1 is a plan view schematically illustrating a liquid crystal display according to an embodiment of the present invention. FIG. 2 is a sectional view taken along the line II-II in the liquid crystal display shown in FIG. 1. FIG. 3 is a sectional view taken along the line III-III in the liquid crystal display shown in FIG. 1. FIG. 4 is a sectional view taken along the line IV-IV in the liquid crystal display shown in FIG. 1. FIG. 5 is a sectional view taken along the line V-V in the liquid crystal display shown in FIG. 1. FIG. 6 is a plan view schematically illustrating a color filter including the liquid crystal display shown in FIGS. 1 to 5. FIG. 7 is a plan view schematically illustrating a solidified liquid crystal layer included in the liquid crystal display shown in FIGS. 1 to 5.

The liquid crystal display shown in FIGS. 1 to 5 is a semi-transparent liquid crystal display using an active matrix driving system. This liquid crystal device includes an array substrate 10, a counter substrate 20, a liquid crystal layer 30, a pair of polarizing plates (not illustrated) and a backlight (not illustrated).

The array substrate 10 includes a substrate 110. The substrate 110 is a light-transmitting substrate such as a glass plate or resin plate.

Pixel circuits (not illustrated), scanning lines (not illustrated), signal lines (not illustrated) and pixel electrodes are formed on one main surface of the substrate 110.

The pixel circuits each contain a switching element such as a thin film transistor. The pixel circuits are arranged in a matrix on the substrate 110.

The scanning lines are arranged correspondingly with the rows of the pixel circuits. The operation of each pixel circuit is controlled by a scanning signal supplied via the scanning line.

The signal lines are arranged correspondingly with the columns of the pixel circuits. Each pixel electrode is connected with the signal lines through the pixel circuits.

Each pixel electrode includes transparent electrodes 150T and reflective electrodes 150R which are electrically connected with each other. A transparent electrode 150T includes a non-overlapped section which does not face a reflective electrode 150R. Among these pixels, a part corresponding to this non-overlapped section is a transmissive display area and a part corresponding to each reflective electrode 150R is a reflective display area.

The transparent electrode 150T is made of a transparent conductor. As the transparent conductor, a transparent conductive oxide such as indium tin oxide and tin oxide may be used.

The reflective electrode 150R is made of a metal or an alloy. As the metal or alloy, aluminum, silver or their alloys may be used.

The reflective electrode 150R is formed on the transparent electrode 150T. The reflective electrode 150R is electrically connected with the transparent electrode 150T. The transparent electrode 150T may be formed on the reflective electrode 150R instead. Alternatively, the reflective electrode 150R and the transparent electrode 150T may be electrically connected with each other through other conductors.

The pixel electrode is coated with an alignment film 160. The alignment film 160 is, for example, a vertical alignment film. As the material of the alignment film, for example, a transparent layer of resin such as a polyimide may be used.

The counter substrate 20 includes a substrate 210. The substrate 210 faces the alignment film 160. The substrate 210 is a light-transmitting substrate such as a glass plate or a resin plate.

A solidified liquid crystal layer 230, a color filter layer 220, a counter electrode 250 and an alignment film 260 are formed in this order on the surface of the substrate 210 on the side facing the alignment film 160.

The color filter layer 220 includes plural unit areas arranged on one main surface of the substrate 210. Each unit area includes first to third coloring pixels arranged on the above main surface. The color filter layer 220 is provided with plural through-holes TH.

First coloring pixels face some transparent electrodes 150T. The first coloring pixels form a plurality of band patterns which are each extended in the direction of Y and arranged in the direction of X. In this case, the directions of X and Y are ones which are parallel to the above main surface of the substrate 210 and intersect with each other. The direction of Z is perpendicular to the directions of X and Y.

The first coloring pixels include first coloring sections 220a and first non-coloring sections as a part of through-holes TH.

The first coloring sections 220a are disposed at places corresponding to parts exposed from the reflective electrodes 150R among the transparent electrodes 150T facing the first coloring pixels and to some reflective electrodes 150R facing the first coloring pixels. The first non-coloring sections are disposed at places corresponding to the remaining parts of the reflective electrodes 150R facing the first coloring pixels.

Second coloring pixels face other parts of the transparent electrodes 150T. The second coloring pixels form a plurality of band patterns which are each extended in the direction of Y and arranged in the direction of X.

The second coloring pixels include second coloring sections 220b and second non-coloring sections as other parts of the through-holes TH. The second coloring sections 220b are disposed at places corresponding to parts exposed from the reflective electrodes 150R among the transparent electrodes 150T facing the second coloring pixels and to some reflective electrodes 150R facing the second coloring pixels. The second non-coloring sections are disposed at places corresponding to the remaining parts of the reflective electrodes 150R facing the second coloring pixels.

Alternatively, all the parts corresponding to the reflective electrodes 150R facing the second coloring pixels may be fourth coloring sections 220d. In this case, the second coloring sections 220b are disposed only on parts exposed from the reflective electrodes 150R among the transparent electrodes 150T facing the second coloring pixels.

The wavelength of the light which the coloring sections 220b and 220d transmit is shorter than that of the light which the coloring section 220a transmits and longer than the wavelength of the light which the coloring section 220c transmits, when white light is applied. Therefore, the coloring section 220d has a larger transmittance than the coloring section 220b. For example, the wavelength of the light which each of the coloring sections 220b and 220d primarily transmit when white light is applied is closer to 550 nm compared to the wavelength of the light which each of the coloring sections 220*a* and 220*c* primarily transmit when white light is applied. Here, as an example, the first coloring section 220*a* is a red coloring layer and the coloring sections 220*b* and 220*d* are each a green coloring layer.

Third coloring pixels are further disposed facing other parts of the transparent electrodes 150T. The third coloring pixels form a plurality of band patterns which are each extended in the direction of Y and arranged in the direction of X.

The third coloring pixel includes a third coloring section 220*c* and a third non-coloring section as a part of throughholes TH.

The light which the third coloring section 220*c* primarily transmits has a shorter wavelength than the light which the second coloring section 220*b* transmits when white light is applied. The case in which the third coloring section 220*c* is a blue coloring layer will be discussed.

The third coloring sections 220*c* are disposed at places corresponding to parts exposed from the reflective electrodes 150R among the transparent electrodes 150T facing the third coloring pixels and to some reflective electrodes 150R facing the third coloring pixels. The third non-coloring sections are disposed at places corresponding to the remainder parts of the reflective electrodes 150R facing the third coloring pixels.

In this case, a part of one through-hole TH is the first non-coloring section and other parts of the through-hole TH are the second non-coloring section and third non-coloring section. However, the embodiment is not limited by this. Different through-holes may be formed as the first, second and third non-coloring sections. Alternatively, at least one of the first to third non-coloring sections may be formed of a plurality of through-holes.

Also, the through-hole TH may be filled with a transparent material. For example, the entire surface of the color filter layer 220 is coated with a flattened layer made of a transparent material to fill the through-hole TH with the transparent material. As the transparent material, for example, an optically isotropic transparent resin is used.

The band-like patterns formed by the first coloring pixels, the band-like patterns formed by the second coloring pixels and the band-like patterns formed by the third coloring pixels are disposed side by side in the direction of X. Namely, the first to third coloring pixels form a stripe arrangement. The first to third coloring pixels may form other arrangements. The first to third coloring pixels may form, for example, a square arrangement or a delta arrangement.

The solidified liquid crystal layer 230 is a retardation layer. The solidified liquid crystal layer 230 is interposed between the substrate 210 and the color filter layer 220. The solidified liquid crystal layer 230 is typically a continuous film. The solidified liquid crystal layer 230 is produced by polymerization and/or crosslinking of a thermotropic liquid crystal compound or composition. The solidified liquid crystal layer 230 is typically a continuous film having an almost uniform thickness.

An alignment layer may be interposed between the solidified liquid crystal layer 230 and the substrate 210. As the alignment layer, for example, a resin layer whose entire surface is uniformly aligned by a rubbing treatment or optical alignment process may be used. As this resin layer, for example, a polyimide layer may be used.

The solidified liquid crystal layer 230 includes regions 230Ta to 230Tc and 230Ra to 230Rc. Each of the regions 230Ta to 230Tc and regions 230Ra to 230Rc is a region extending from one main surface to other main surface of the solidified liquid crystal layer 230. The regions 230Ta to 230Tc and regions 230Ra to 230Rc are disposed side by side in a direction perpendicular to the direction of Z.

The region 230Ta is a region corresponding to a part of coloring sections 220*a* in the solidified liquid crystal layer 230. The region 230Ra is a reflective display area corresponding to another part of the coloring section 220*a* in the solidified liquid crystal layer 230. Specifically, the region 230Ta is a transmissive display area corresponding to a part which does not face the reflective electrode 150R among the coloring sections 220*a*. Therefore, the region 230Ra is a reflective display area corresponding to a part facing the reflective electrode 150R among the coloring sections 220*a*. In each of the regions 230Ta and 230Ra, the degree of orientation of mesogens is almost uniform.

As used herein, the term "the degree of orientation of mesogens" at a certain place means the degree of orientation of mesogens at that place. The degree of orientation of mesogens may be constant over the entire area or may be varied along the direction of Z. For example, the degree of orientation may be higher near the lower surface and lower near the upper surface. In this case, the "degree of orientation of mesogens" refers to an average of the degree of orientation in the direction of thickness. It can be confirmed that the degree of orientation in a certain area is larger than that in other areas by comparing the reflectance anisotropies of these areas with each other.

A region 230Tb is a region corresponding to a part of coloring sections 220*b* in the solidified liquid crystal layer 230. A region 230Rb is a region corresponding to other part of coloring sections 220*b* and to the second non-coloring sections, that is, the through-hole TH in the solidified liquid crystal layer. Alternatively, the region 230Rb is a region corresponding to the coloring section 220*d*. Specifically, the region 230Tb is a transmissive display area corresponding to a part which does not face the reflective electrode 150R among the coloring sections 220*b*. Then, the region 230Rb is a reflective display area and corresponds to a part facing the reflective electrode 150R among the coloring sections 220*b* and also corresponds to the through-hole TH. Alternatively, the region 230Rb corresponds to the coloring section 220*d*. In each of the regions 230Tb and 230Rb, the degree of orientation of mesogens is almost uniform.

The region 230Tc is a region corresponding to a part of the coloring sections 220*c* in the solidified liquid crystal layer 230. The region 230Rc is a reflective display area corresponding to other part of the coloring section 220*c* in the solidified liquid crystal layer 230. Specifically, the region 230Tc is a transmissive display area corresponding to a part which does not face the reflective electrode 150R. Therefore, the region 230Rc is a reflective display area corresponding to a part facing the reflective electrode 150R among the coloring sections 220*c*. In each of the regions 230Tc and 230Rc, the degree of orientation of mesogens is almost uniform.

In each of the regions 230Ta to 230Tc, for example, the mesogens are not oriented, or the degree of orientation of mesogens is smaller than that in the regions 230Ra to 230Rc. In the regions 230Ta to 230Tc, the degrees of orientation of mesogens may be the same or different. It is assumed that the mesogens are not oriented in the regions 230Ta to 230Tc. In other words, the regions 230Ta to 230Tc are assumed to be optically isotropic.

Each of the regions 230Ra to 230Rc has a larger degree of orientation of mesogens than the regions 230Ta to 230Tc. Therefore, the regions 230Ra to 230Rc differ from each other in the degree of orientation of mesogens. For example, the region 230Ra has a higher degree of orientation of mesogens than the region 230Rb and the region 230Rb has a higher degree of orientation of mesogens than the region 230Rc. In this case, the region 230Ra has a higher refractive index anisotropy than the region 230Rb and the region 230Rb has a higher refractive index anisotropy than the region 230Rc.

As mentioned above, the solidified liquid crystal layer 230 includes the first region 230Ra, second region 230Rb and third region 230Rc and these first to third regions are reflective display areas. These first to third regions 230Ra, 230Rb and 230Rc are each constituted of two sub-regions. For example, in the region 230Ra of the first region 230a, the region facing the first coloring section 220a is a 1A sub-region and the region facing the first non-coloring section (through-hole TH) is a 1B sub-region. The 1A sub-region and 1B sub-region are referred to as a sub-region 230RaA and a sub-region 230RaB respectively.

Similarly, among the regions 230Rb in the second region 230b, the region facing the second coloring section 220b is a 2A sub-region (sub-region 230RbA) and the region facing the second non-coloring section (through-hole TH) is a 2B sub-region (sub-region 230RbB). Among the regions 230Rc in the third region 230c, the region facing the third coloring section 220c is a 3A sub-region (sub-region 230RcA) and the region facing the third non-coloring section (through-hole TH) is a third B sub-region (sub-region 230RcB).

Six sub-regions, that is, the 1A and 1B sub-regions, 2A and 2B sub-regions and 3A and 3B sub-regions exist in the reflective display area, and the in-plane birefringence of these six sub-regions fulfill the following relation. Specifically, the 1A sub-region 230RaA has a larger in-plane birefringence than the 2A sub-region 230RbA, and the 3A sub-region 230RcA has a smaller in-plane birefringence than the 2A sub-region 230RbA. Also, the in-plane birefringence of the 1B sub-region 230RaB is almost the same as that of the 3B sub-region 230RcB, smaller than that of the 1A sub-region 230RaA and larger than that of the 3A sub-region 230RcA.

The 1B sub-region 230RaB, 2B sub-region 230RbB and 3B sub-region 230RcB are made to have almost the same in-plane birefringence.

The in-plane birefringence of the 1B sub-region 230RaB, 2B sub-region 230RbB and 3B sub-region 230RcB can be made to be almost the same as that of the 2A sub-region 230RbA. This is advantageous in the point that disorders caused by misregistration are decreased.

The in-plane birefringence of the 1B sub-region 230RaB is almost the same as that of the 3B sub-region 230RcB and is different from that of the 2B sub-region 230RbB. The in-plane birefringence of the 2B sub-region 230RbB may be made to be almost the same as that of the 2A sub-region 230RbA. In this case, a solidified liquid crystal layer which can cope with a four-color filter is obtained.

For example, the regions 230Ra to 230Rc are each optically uniaxial and their retardation axes are assumed to be parallel to the direction of X. In addition, it is assumed here that the retardation of the region 230Ra is ¼ the center wavelength of the light which the coloring section 220a transmits, the retardation of the region 230Rb is ¼ the center wavelength of the light which the coloring section 220b or 220d transmits and the retardation of the region 230Rc is ¼ the center wavelength of the light which the coloring section 220c transmits. In this case, "the center wavelength" of the certain light is a wavelength at which the spectrum of the light exhibits the maximum intensity.

The counter electrode 250 is formed on the color filter layer 220. The counter electrode 250 is a continuous film extending over the display area. The counter electrode 250 is made of the above-described transparent conductor, for example.

The alignment layer 260 covers the counter electrode 250. The alignment layer 260 is, for example, a vertical alignment layer. As the material of the alignment layer 260, for example, a transparent layer of resin such as polyimide may be used.

The substrate 210, the color filter layer 220 and the solidified liquid crystal layer 230 constitute the color filter substrate. The color filter substrate may further include other components. The color filter substrate may further include, for example, the counter electrode 250. Alternatively, the color filter substrate may further include a black matrix.

The array substrate 10 and the counter substrate 20 are bonded together via a frame-shaped adhesive layer (not shown). The array substrate 10, the counter substrate 20 and the adhesive layer form a hollow structure.

The liquid crystal layer 30 is made of a liquid crystal compound or a liquid crystal composition. The liquid crystal compound or liquid crystal composition has flowability and fills the space enclosed with the array substrate 10, counter substrate 20 and adhesive layer. The array substrate 10, counter substrate 20, adhesive layer and liquid crystal layer 30 form a liquid crystal cell.

One example is a liquid crystal compound including the liquid crystal layer 30, in which a liquid crystal molecule which contains mesogens having rod-like shape have a negative dielectric anisotropy, wherein mesogens of the liquid crystal molecules are oriented almost in parallel to the direction of Z when no voltage is applied. Also, mesogens of the liquid crystal molecules are inclined to the direction of X or Y with the direction of Z or oriented almost in parallel to the direction of X or Y when voltage is applied. The retardation of the liquid crystal layer 30 at this time is assumed to be ¼ the center wavelength $\lambda$ of the light which the third coloring section 220c transmits.

The polarizing plates are adhered to the main surfaces of the liquid crystal cell. One example is that these polarizing plates are linear polarizing plates each disposed in such a manner that their transmissive axes intersect orthogonally and form an angel of 45° with respect to the direction of X.

The backlight faces the array substrate 10 with a polarizing plate interposed therebetween. The backlight, for example, emits white light toward the liquid crystal cell.

In this liquid crystal display, each of the retardations of the regions 230Ra to 230Rc may be optionally set. Therefore, a coloring pixel which primarily transmits light having a shorter wavelength is made to have a lower retardation corresponding to the light whereas a coloring pixel which primarily transmits light having a longer wavelength is made to have a higher retardation corresponding to the light. For example, the region 230Ra may be made to serve as a quarter-wave plate for light having almost the same wavelength of the light which the coloring section 220a primarily transmits when the region 230Ra is irradiated with white light. Therefore, the region 230Rb may be made to serve as a quarter-wave plate for light having almost the same wavelength of the light which the coloring section 220b and/or coloring section 220d primarily transmit when the region 230Rb is irradiated with white light. In addition, the region 230Rc may be made to serve as a quarter-wave plate for light having almost the same wavelength of the light which the coloring section 220c primarily transmits when the region 230Rc is irradiated with white light. Therefore, for example, optimum optical compensation can be attained throughout the reflective display section.

Also, in this liquid crystal display, the regions 230Ta and 230Tc may be made to be, for example, optically isotropic.

For this reason, the contrast ratio attained by transmissive display cannot be reduced due to the formation of the solidified liquid crystal layer 230.

Moreover, in this liquid crystal display, the through-hole TH is disposed to make the average transmittance of the reflective display area higher than the transmittance of the transmissive display area in all of the first to third coloring pixels. When such a structure is adopted, a color filter layer can be formed by using less materials and more simplified process as compared with the case of forming the coloring section of the transmissive display area and coloring section of the reflective display area by using different materials in all pixels.

Also, the second coloring pixel has high visibility because the wavelength of light transmitted therethrough lies in the vicinity of the center wavelength of visible light. For this reason, if the same material that is used for the transmissive display area is used as the material of the reflective display area, the brightness of the coloring section is more largely dropped than in the case of designing a high transmittance system by forming the reflective display area using a material different from that of the transmissive display area. In light of this, if it is intended to secure brightness in the case of forming the reflective display area by using the same material as that of the transmissive display area, it is necessary to form a larger through-hole in the second coloring pixel than in the first coloring pixel and third coloring pixel.

In this liquid crystal display, the whole part corresponding to the reflective electrode 150R facing the second coloring pixel may be a fourth coloring section 220d. The second coloring section 220b is formed only in the part exposed from the reflective electrodes 150R among the transparent electrodes 150T facing the second coloring pixel. In this case, a higher quality image can be attained as compared with the case of forming a through-hole in the second coloring pixel.

In addition, in this liquid crystal display, a drop in contrast ratio which is caused by the formation of the through-hole in the color filter layer 220 is reduced. For example, when a black image is displayed, a leakage of light at the through-hole TH is not avoided. When the visibility of the leakage light from the position of the through-hole TH is high, there is the possibility that this light leakage reduces the contrast ratio to a non-negligible level.

In this liquid crystal device, the optical characteristics of the area corresponding to the through-hole TH of the solidified liquid crystal layer 230 is made to equal to the optical characteristics of the area corresponding to the coloring section 220d of the solidified liquid crystal layer 230. The leakage light from the through-hole TH when a black image is displayed is mainly red light and blue light. The red light and blue light are more remarkably reduced in visibility than green light. Therefore, this liquid crystal display suffers less reduction in contrast ratio caused by the formation of the through-hole in the color filter layer 220.

In this manner, the aforementioned semi-transparent liquid crystal display can be produced in a simplified method and attains excellent display performance.

This liquid crystal display can be variously modified.

Figure 8:
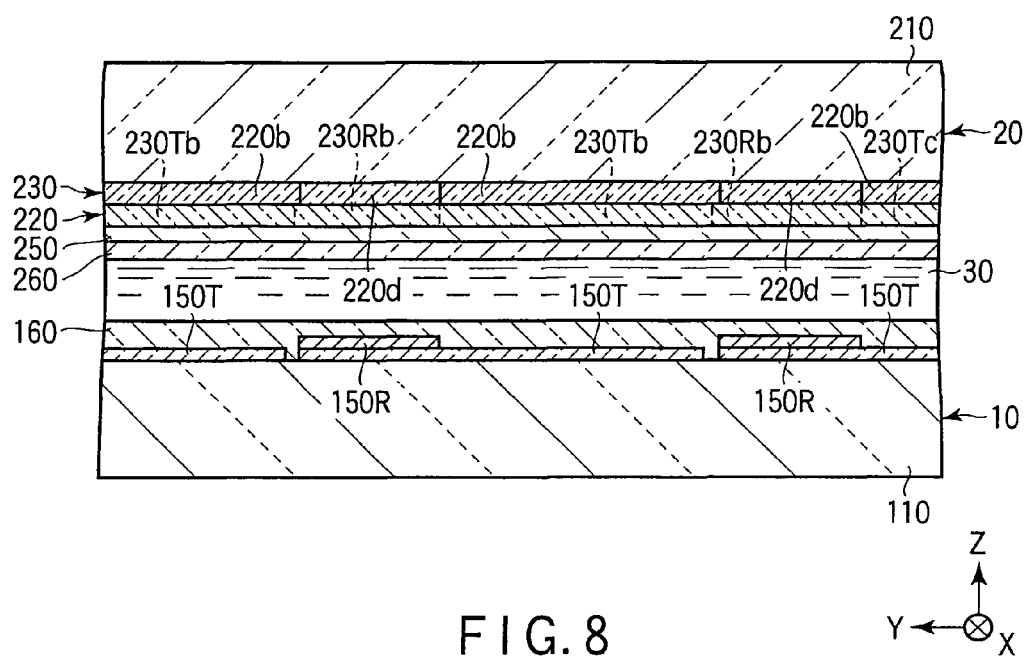
FIG. 8 is a sectional view schematically illustrating a liquid crystal display according to a modification.

FIG. 8 is a sectional view schematically illustrating a liquid crystal display according to a modification.

This liquid crystal display has the same structure as the liquid crystal display described with reference to FIGS. 1 to 7 except that a color filter layer 220 is interposed between the substrate 210 and the solidified liquid crystal layer 230.

In the case of adopting this structure, the solidified liquid crystal layer 230 is formed on the color filter layer 220. The color filter layer 220 is formed with the through-hole as mentioned above. Therefore, there is the case where it is difficult to form the solidified liquid crystal layer 230 in an almost uniform thickness.

In such a case, the through-hole TH may be filled with a transparent material to form the solidified liquid crystal layer 230 on the flat plane obtained by this treatment. For example, the entire surface of the color filter layer 220 may be coated with a flattened layer made of a transparent material and the solidified liquid crystal layer 230 may be formed on this flattened layer. As the transparent material, for example, an optically isotropic transparent resin is used.

A method of manufacturing the color filter substrate included in the liquid crystal display described with reference to FIGS. 1 to 7 will now be described. The color filter substrate included in the liquid crystal display described with reference to FIG. 8 can be manufactured by almost the same method as the following method except that the order of the lamination of the solidified liquid crystal layer 230 and the color filter layer 220 is reversed.

First, a light-transmitting substrate 210 is prepared. The light-transmitting substrate 210 is, for example, a glass plate or a resin plate. The substrate 210 may be a hard material or may be flexible.

The substrate 210 may have a monolayer structure or multilayer structure. For example, a glass plate having a silicon oxide layer and/or a silicon nitride layer formed on the surface thereof may be used as the substrate 210.

Next, the solidified liquid crystal layer 230 is formed on the light-transmitting substrate 210, for example, by the following method.

First, a liquid crystal material layer containing a photopolymerizing or photo-crosslinking thermotropic liquid crystal material is formed on the substrate 210. For example, a liquid crystal material layer is formed in which the mesogens are oriented in one direction parallel to the main surface of the substrate 210. Then, this liquid crystal material layer is subjected to pattern exposure and heat treatment to obtain the solidified liquid crystal layer 230.

The liquid crystal material layer can be obtained by applying a coating solution containing a thermotropic liquid crystal compound to the substrate 210 and by drying the coating film according to necessity. In the liquid crystal material layer, the mesogens of the thermotropic liquid crystal compound form an orientated structure.

The coating solution may be formulated with, besides the thermotropic liquid crystal compound, components, for example, a solvent, a chiral agent, a photo-polymerization initiator, thermal polymerization initiator, a sensitizer, a chain transfer agent, a polyfunctional monomer and/or oligomer, a resin, a surfactant, a polymerization inhibitor, a storage-stability improver and an adhesion improver may be added to the extent that the liquid crystallinity of the composition containing this liquid crystal compound is lost.

As the thermotropic liquid crystal compound, alkylcycanobiphenyl, alkoxybiphenyl, alkylterphenyl, phenylcyclohexane, biphenylcyclohexane, phenylbicyclohexane, pyrimidine, cyclohexane carboxylate, halogenated cyanophenol esters, alkyl benzoate, alkylcyanotolan, dialkoxytolan, alkylalkoxytolan, alkylcyclohexyltolan, alkylbicylohexane, cyclohexylphenylethylene, alkylcyclohexylcyclohexene, alkylbenzaldhydroazine, alkenylbenzaldehydroazine, phenylnaphthalene, phenyltetrahydronaphthalene and phenyldecahydronaphthalene, derivatives thereof or acrylates of these compounds can be used, for example.

As the solvent, cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl-n-amylketone, propylene glycol monomethyl ether, toluene, methyl ethyl ketone, ethyl acetate, methanol, ethanol, isopropyl alcohol, butanol, isobutyl ketone, petroleum solvent or mixtures containing two or more thereof can be used, for example.

As the photo-polymerization initiator, acetophenone-based photo-polymerization initiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexylphenyl ketone, 2-methyl-1[4-(methylthio)phenyl]-2-morpholinopropan-1-one and 2-benzyl-2-dimethylamino-1-(4-morpholinophenyl)-butan-1-one; benzoin-based photo-polymerization initiators such as benzoin, benzoin methyl ether, benzoin ethyl ether, benzoin isopropyl ether and benzyl dimethyl ketal; benzophenone-based photo-polymerization initiators such as benzophenone, benzoylbenzoic acid, methyl benzoylbenzoate, 4-phenylbenzophenone, hydroxybenzophenone, acrylated benzophenone and 4-benzoyl-4'-methyldiphenyl sulfide; thioxanthone-based photo-polymerization initiators such as thioxanthone, 2-chlorothioxanthone, 2-methylthioxanthone, isopropylthioxanthone and 2,4-diisopropylthioxanthone; triazine-based photo-polymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine and 2,4-trichloromethyl(4'-methoxystyryl)-6-triazine; borate-based photo-polymerization initiators; carbazole-based photo-polymerization initiators; and imidazole-based photo-polymerization initiators; or mixtures containing two or more thereof can be used, for example.

The sensitizer may be used together with, for example, a photo-polymerization initiator. As the sensitizer, α-acyloxy ester, acylphosphine oxide, methylphenyl glyoxylate, benzyl, 9,10-phenanthrenequinone, camphorquinone, ethylanthraquinone, 4,4'-diethylisophthalophenone, 3,3',4,4'-tetra(t-butylperoxycarbonyl)benzophenone and 4,4'-diethylaminobenzophenone can be used, for example.

As the chain transfer agent, for example, a polyfunctional thiol may be used. The polyfunctional thiol is a compound having two or more thiol groups. As the polyfunctional thiol, hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropanetris(3-mercaptobutylate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine and 2-(N,N-dibutylamino)-4,6-dimercapto-s-triazine or mixtures containing two or more thereof can be used, for example.

As the polyfunctional monomer and/or oligomer, acrylates and methacrylates such as 2-hydroxyethylacrylate, 2-hydroxyethylmethacrylate, 2-hydroxypropylacrylate, 2-hydroxypropylmethacrylate, cyclohexylacrylate, cyclohexylmethacrylate, polyethylene glycol diacrylate, polyethylene glycol dimethacrylate, pentaerythritol triacrylate, pentaerythritol trimethacrylate, trimethylolpropanetriacrylate, trimethylolpropanetrimethacrylate, dipentaerythritol hexaacrylate, dipentaerythritol hexamethacrylate, tricyclodecanylacrylate, tricyclodecanylmethacrylate, melamineacrylate, melaminemethacrylate, epoxyacrylate and epoxymethacrylate; acrylic acids, methacrylic acids, styrene, vinyl acetate, acrylamide, methacrylamide, N-hydroxymethylacrylamide, N-hydroxymethylmethacrylamide and acrylonitrile or mixture containing two or more thereof can be used, for example.

As the resin, for example, a thermoplastic resin, thermosetting resin or photosensitive resin may be used.

As the thermoplastic resin, butyral resins, styrene-maleic acid copolymers, chlorinated polyethylenes, chlorinated polypropylenes, polyvinyl chlorides, vinyl chloride-vinyl acetate copolymers, polyvinyl acetates, polyurethane type resins, polyester resins, acrylic resins, alkyd resins, polystyrene resins, polyamide resins, rubber-based resins, cyclized rubber-based resins, celluloses, polybutadiens, polyethylenes, polypropylenes and polyimide resins can be used, for example.

As the thermosetting resin, for example, epoxy resins, benzoguanamine resins, rosin-modified maleic resins, rosin-modified fumaric resins, melamine resins, urea resins or phenol resins may be used.

As the photosensitive resin, resins obtained by causing the reaction of an acrylic compound, a methacrylic compound or cinnamic acid having a reactive substituent such as isocyanate group, aldehyde group and epoxy group with a linear polymer having a reactive substituent such as hydroxyl group, carboxyl group and amino group to introduce photo-crosslinking groups such as acryloyl groups, methacryloyl groups and stylyl groups into the linear polymer can be used, for example. Alternatively, resins obtained by half-esterifying a linear polymer including acid anhydride such as styrene-maleic anhydride copolymer and α-olefin-maleic anhydride copolymer using acrylic compounds or methacrylic compounds having hydroxyl group such as hydroxyalkyl acrylates and hydroxyalkyl methacrylates may be used.

As the surfactant, an anionic surfactant such as polyoxyethylene alkylether sulfate, dodecylbenzene sodium sulfonate, alkali salt of styrene-acrylic acid copolymer, alkylnaphthaline sodium sulfonate, alkyldiphenyl ether sodium disulfonate, monoethanol amine lauryl sulfate, triethanol amine lauryl sulfate, ammonium lauryl sulfate, monoethanol amine stearate, sodium stearate, sodium lauryl sulfate, monoethanol amine of styrene-acrylic acid copolymer and polyoxyethylene alkylether phosphate; a nonionic surfactant such as polyoxyethylene oleyl ether, polyoxyethylene lauryl ether, polyoxyethylene nonylphenyl ether, polyoxyethylene alkylether phosphate, polyoxyethylene sorbitan monostearate and polyethyleneglycol monolaurate; a cationic surfactant such as alkyl quaternary ammonium salt and an ethylene oxide adduct thereof; an amphoteric surfactant such as alkyl betaine, e.g. betaine alkyldimethyl aminoacetate and alkylimidazoline; and a mixture containing two or more of them can be used, for example.

As the polymerization inhibitor, for example, phenol-based inhibitors such as 2,6-di-t-butyl-p-cresol, 3-t-butyl-4-hydroxyanisole, 2-t-butyl-4-hydroxyanisole, 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-thiobis(3-methyl-6-t-butylphenol), styrenated phenol, styrenated p-cresol, 1,1,3-tris(2-methyl-4-hydroxy-5-t-butylphenyl)butane, tetrakis[methylene-3-(3', 5'-di-1-butyl-4'-hydroxyphenyl)propionate]methane, octadecyl 3-(3,5-di-t-butyl-4-hydroxyphenylpropionate), 1,3,5-trimethyl-2,4,6-tris(3,5-di-t-butyl-4-hydroxybenzyl) benzene, 2,2'-dihydroxy-3,3'-di(α-methylcyclohexyl)-5,5'-dimethyldiphenylmethane, 4,4'-methylenebis(2,6-di-t-butylphenol), tris(3,5-di-t-butyl-4-hydroxyphenyl)

isocyanurate, 1,3,5-tris(3',5'-di-t-butyl-4-hydroxybenzoyl) isocyanurate, bis[2-methyl-4-(3-n-alkylthiopropionyloxy)-5-t-butylphenyl]sulfide, 1-oxy-3-methyl-isopropylbenzene, 2,5-di-t-butylhydroquinone, 2,2'-methylenebis(4-methyl-6-nonylphenol), alkylated bisphenol, 2,5-di-t-amylhydroquinone, polybutylated Bisphenol A, Bisphenol A, 2,6-di-t-butyl-p-ethylphenol, 2,6-bis(2'-hydroxy-3-t-butyl-5'-methyl-benzyl)-4-methylphenol, 1,3,5-tris(4-t-butyl-3-hydroxy-2,6-dimethylbenzyl)isocyanurate, terephthaloyl-di(2,6-dimethyl-4-t-butyl-3-hydroxybenzyl sulfide), 2,6-di-t-butylphenol, 2,6-di-t-butyl-α-dimethylamino-p-cresol, 2,2'-methylene-bis(4-methyl-6-cyclohexylphenol), triethylene glycol-bis[3-(3-t-butyl-5-methyl-4-hydroxyphenyl)propionate], hexamethylene glycol-bis(3,5-di-t-butyl-4-hydroxyphenyl)propionate, 3,5-di-t-butyl-4-hydroxytoluene, 6-(4-hydroxy-3,5-di-t-butylaniline)-2,4-bis(octylthio)-1,3,5-triazine, N,N'-hexamethylenebis(3,5-di-t-butyl-4-hydroxyhydrocyamide), diethyl 3,5-di-t-butyl-4-hydroxybenzylphosphate, 2,4-dimethyl-6-t-butylphenol, 4,4'-methylenebis(2,6-di-t-butylphenol), 4,4'-thiobis(2-methyl-6-t-butylphenol), tris[β-(3,5-di-t-butyl-4-hydroxyphenyl)propionyl-oxyethyl] isocyanurate, 2,4,6-tributylphenol, glycol bis[3,3-bis(4'-hydroxy-3'-t-butylphenyl)-butylate], 4-hydroxymethyl-2,6-di-t-butylphenol and bis(3-methyl-4-hydroxy-5-t-butylbenzyl)sulfide; amine-based inhibitors such as N-phenyl-N'-isopropyl-p-phenylenediamine, N-phenyl-N'-(1,3-dimethylbutyl)-p-phenylenediamine, N,N'-diphenyl-p-phenylenediamine, 2,2,4-trimethyl-1,2-dihydroquinoline polymer and diaryl-p-phenylenediamine; sulfur-based inhibitors such as dilauryl-thiodipropionate, distearyl-thiodipropionate and 2-mercaptobenzimidanol; and phosphorous-based inhibitors such as distearylpentaerythritol diphosphite; or mixtures containing two or more thereof can be used.

As the storage-stability improver, for example, benzyltrimethyl chloride; quaternary ammonium chlorides such as diethylhydroxyamine, organic acids such as lactic acid and oxalic acid; their methyl ethers; t-butylpyrocatechol; organic phosphines such as tetraethylphosphine and tetraphenylphosphine; and phosphites; or mixtures of two or more thereof can be used.

As the adhesion improver, for example, a silane coupling agent may be used. As the silane coupling agent, vinyl silane such as vinyl tris(β-methoxyethoxy)silane, vinylethoxy silane and vinyltrimethoxy silane; acrylsilane and metacrylsilane such as γ-methacryloxypropyl trimethoxy silane; epoxy silane such as β-(3,4-epoxycyclohexyl)ethyltrimethoxy silane, β-(3,4-epoxycyclohexyl)methyltrimethoxy silane, β-(3,4-epoxycyclohexyl)ethyltriethoxy silane, β-(3,4-epoxycyclohexyl)methyltriethoxy silane, γ-glycidoxypropyl trimethoxy silane and γ-glycidoxypropyl triethoxy silane; amino silane such as N-β(aminoethyl) γ-aminopropyl trimethoxy silane, N-β(aminoethyl) γ-aminopropyl triethoxy silane, N-β(aminoethyl) γ-aminopropyl methyldiethoxy silane, γ-aminopropyl triethoxy silane, γ-aminopropyl trimethoxy silane, N-phenyl-γ-aminopropyl trimethoxy silane and N-phenyl-γ-aminopropyl triethoxy silane; γ-mercaptopropyl trimethoxy silane; γ-mercaptopropyl triethoxy silane; or a mixture containing two or more of them can be used, for example.

For applying the coating solution, a printing method such as spin coating, slit coating, relief printing, screen printing, planographic printing, reverse printing and gravure printing; the printing method incorporated into an offset system; an inkjet method; or bar coat method can be used, for example.

The liquid crystal material layer is formed, for example, as a continuous layer having a uniform thickness. According to the method described above, the liquid crystal material layer can be formed as a continuous film having a uniform thickness as long as the surface to be coated is sufficiently flat.

Prior to the application of the coating solution, the surface of the substrate 210 may be subjected to an alignment process. Alternatively, prior to the application of the coating solution, an alignment layer for regulating the orientation of the liquid crystal compound may be formed on the substrate 210. Forming a transparent layer of resin such as polyimide on the substrate 210 and subjecting the transparent resin layer to an alignment process such as rubbing process can obtain the alignment layer, for example. The alignment layer may be formed using a photo-alignment technique.

Then, a first exposure process is performed. That is, regions of the liquid crystal material layer are irradiated with light at different exposure values, respectively. For example, the region of the liquid crystal material layer that corresponds to the region 230Ra is irradiated with light at the maximum exposure value. The region of liquid crystal material layer that corresponds to the region 230Rb is irradiated with light L at an exposure value lower than that for the region 230Ra. The region of the liquid crystal material layer that corresponds to the region 230Rc is irradiated with light L at an exposure value lower than that for the region that corresponds to the region 230Rb. Then, for example, the regions corresponding to the regions 230Ta to 230Tc in the liquid crystal material layer are not irradiated with light. Thus, at the portions of the liquid crystal material layer that are irradiated with the light, the thermotropic liquid crystal compound polymerizes or forms crosslinks while maintaining the alignment structure of the mesogens.

In the polymerized or crosslinked products of the thermotropic liquid crystal compound, mesogenic groups are immobilized. The region irradiated with light at the maximum exposure value is the highest in the content of the polymerized or crosslinked product of the thermotropic liquid crystal compound and the lowest in the unpolymerized or uncrosslinked thermotropic liquid crystal compound. Then, the content of polymerized or crosslinked products is reduced and the content of unpolymerized or uncrosslinked thermotropic liquid crystal compound is increased with a decrease in exposure value.

Accordingly, the mesogenic groups are immobilized in a higher ratio in a region where the exposure value is larger and in a lower ratio in a region where the exposure value is smaller. Therefore, in a region where the exposure value is zero, the mesogenic groups are not immobilized.

The light used in the first exposure process is electromagnetic waves such as ultraviolet rays, visible rays and infrared rays. An electron beam may be used instead of the electromagnetic waves. Only one of them may be used as the light. Alternatively, two or more of them may be used as the light.

The first exposure process may be performed by any method as long as the above-described nonuniform polymerization or crosslinking can be caused. For example, in this exposure process, exposure using a photomask may be performed two or more times. Or, in this exposure process, exposure using a halftone mask, gray tone mask or wavelength-limiting mask may be performed. Alternatively, the liquid crystal material layer may be scanned with rays or luminous flux such as electron beam instead of using a photomask. Alternatively, the above-described techniques may be combined together.

After completing the first exposure process, a first heat treatment process is performed. That is, the liquid crystal material layer is heated to a temperature equal to or higher than the phase transition temperature at which the thermotropic liquid crystal compound changes from a liquid crystal phase to an isotropic phase. The mesogens of the thermotropic liquid crystal compound as an unreacted compound are not immobilized. Therefore, when the liquid crystal material layer is heated to the phase transition temperature or higher, the degree of orientation of the mesogens of the unreacted compound is lowered. For example, the mesogens of the unreacted compound changes from the liquid crystal phase to the isotropic phase. On the other hand, the mesogens of the polymerized or crosslinked product of the thermotropic liquid crystal compound are immobilized.

Therefore, in the area irradiated with smaller exposure value in the first exposure process, the degree of the orientation of the mesogens is more lowered than that in the region irradiated with larger exposure value. Consequently, in the region non-irradiated with light in the first exposure process, the alignment structure of the mesogens disappears.

Then, the unreacted compound is polymerized and/or crosslinked while the degree of orientation of the mesogens of the unreacted compound kept lowered.

For example, a second exposure process described below is performed. That is, the entire liquid crystal material layer is irradiated with light while keeping the temperature of the liquid crystal material layer higher than the phase transition temperature at which the thermotropic liquid crystal material changes from an isotropic phase to a liquid crystal phase. The liquid crystal material layer is irradiated with light at an exposure value sufficient for almost all of whole unreacted compound to cause the polymerization or crosslinking reaction. Thus, the unreacted compound is polymerized or crosslinked to immobilize the mesogens whose degree of orientation has been lowered. As above, the solidified liquid crystal layer 230 is obtained.

Note that a first phase transition temperature of some liquid crystal compounds at which an isotropic phase changes to a liquid crystal phase is lower than a second phase transition temperature at which the liquid crystal phase changes to the isotropic phase. Therefore, in a particular case, the temperature of the liquid crystal material layer in the second exposure process may be lower than the heating temperature in the first heat treatment process. In ordinary cases, the temperature of the liquid crystal material layer in the second exposure process is set at the first phase transition temperature or higher in terms of convenient.

In the second exposure process, the same light that is exemplified as the light usable in the first exposure process may be used. The light used in the second exposure process and the light used in the first exposure process may be the same or not.

In the second exposure process, the exposure value may be uniform throughout the entire liquid crystal material layer. In this case, it is unnecessary to use a photomask provide with a fine pattern. Therefore, in this case, the process can be simplified.

Alternatively, the second exposure process may be performed such that the total exposure value, which is the sum of the exposure value in the first exposure process and the exposure value in the second exposure process, is equal in all regions. When, for example, the total exposure value in a certain region is remarkably higher than the total exposure value in another region, if the total exposure value in the other region is designed to be sufficiently large, the former region sustains undesirable damage or the color filter 220 possibly sustains undesirable damage in the vicinity of this region. When the total exposure value is made to be equal in all regions, such damage can be prevented.

The polymerization and/or crosslinking of the unreacted compound can be performed by other methods.

For example, in the case where the unreacted compound, i.e., the thermotropic liquid crystal compound is a substance that polymerizes and/or forms crosslinks when heated to a polymerization and/or crosslinking temperature higher than the first phase transition temperature, a second heat treatment process may be performed instead of the second exposure process. Specifically, instead of the second exposure process, the liquid crystal material layer is heated to the polymerization and/or crosslinking temperature or higher to cause the polymerization and/or crosslinking of the unreacted compound. Thus, the solidified liquid crystal layer 230 is obtained. Note that the heating temperature in the first heat treatment is set, for example, equal to or higher than the first phase transition temperature and lower than the polymerization and/or crosslinking temperature.

Alternatively, the second heat treatment process and the second exposure process may be performed in this order after the first heat treatment process. Alternatively, the second exposure process and the second heat treatment process may be performed in this order after the first heat treatment process. Alternatively, the second heat treatment process, the second exposure process and the second heat treatment process may be performed in this order after the first heat treatment process. When the second exposure process and the second heat treatment process are combined together as above, the polymerization and/or crosslinking of the unreacted compound can proceed with a higher degree of reliability. Therefore, a stronger solidified liquid crystal layer 230 can be obtained.

In the case where the unreacted compound is the substance that polymerizes and/or forms crosslinks when heated to a certain temperature, the heating temperature in the first heat treatment may be equal to or higher than the temperature at which it polymerizes and/or forms crosslinks. However, in this case, the decrease in the degree of orientation and the polymerization and/or crosslinking proceed simultaneously. For this reason, the influence of the manufacturing conditions on the optical properties of the solidified liquid crystal layer 230 is comparatively large.

Meanwhile, in the case where a developing process is performed after the first exposure process, obtained is the solidified liquid crystal layer that includes regions equal in refractive index anisotropy to each other and different in thickness from each other. The regions cause different retardations because they are different in thickness from each other.

However, conditions of a wet process, in particular, a development is difficult to control precisely, and these conditions greatly affect the optical properties of the final product. For this reason, according to the method including a wet process, deviations of the optical properties from the target values prone to occur.

In contrast, according to the method described above, no wet process is performed in the first exposure process or later. Therefore, according to this method, it is possible to prevent the deviation of the refractive index anisotropy from the target value due to the wet process.

Note that the refractive index anisotropy and the exposure value in the first exposure process are not always in a proportional relation. However, under the conditions in which materials and the exposure values are unchanged, the reproducibility of the refractive index anisotropy is high. Therefore, the conditions, for example, an exposure value necessary for achieving certain refractive index anisotropy can be found out easily, and a stable manufacture can be done easily.

The solidified liquid crystal layer 230 is formed in the above manner, and coloring sections 220a to 220d of the color filter layer 220 are formed on this solidified liquid crystal layer 230.

Each of the coloring sections 220a to 220d contains a transparent resin and a pigment dispersed in the transparent resin. Each of these coloring sections 220a to 220d is obtained, for example, by forming a thin film pattern of a coloring composition containing a pigment carrier and a pigment dispersed in the carrier and by curing this thin film pattern. This thin film pattern may be formed by utilizing the printing method, photolithographic method, ink jet method, electrodeposition method or transcribing method.

As this pigment, an organic pigment and/or inorganic pigment may be used. Each of the coloring sections 220a to 220d may contain a single organic or inorganic pigment, or plural of organic and/or inorganic pigments.

The transparent resins are resins, such as acryl resins and methacryl resins, which have a high transmittance over the entire wavelength range of visible light, for example, the wavelength range of 400 to 700 nm. As the material of the transparent resin, for example, a photosensitive resin may be used.

In this method, there is no possibility that the color filter layer 220 is subjected to the exposure process and the heat treatment process for forming the solidified liquid crystal layer 230. Therefore, the deterioration of the color filter layer 220 is not caused by the above exposure process and heat treatment process.

Also, in this method, the color filter layer 220 can be formed on the solidified liquid crystal layer 230 typically having an almost flat surface. Therefore, in this case, the color filter layer 220 that derivers the design performance can be obtained more easily as compared with the case where the color filter layer 220 is formed on a surface provided with a relief structure.

When the solidified liquid crystal layer 230 is formed on the color filter layer 220, the solidified liquid crystal layer 230 may be made to play a part in limiting the contamination of impurities in the liquid crystal material layer 30 from the color filter layer 220.

The effect of the present invention will be described below by way of examples of scientific calculation by simulation. However, the desirable structure of the present invention is not limited to the above examples.

The following conditions common to these calculations were set when these calculations were made.

The transmittances of the polarizing plates are listed together in the following Table 1.

TABLE 1

|  | 450 nm | 535 nm | 630 nm |
| --- | --- | --- | --- |
| Single substance | 40.24% | 43.52% | 43.95% |
| When two transmissive axes are arranged in parallel | 32.19% | 37.57% | 38.28% |
| When two transmissive axes are arranged vertically | 0.015% | 0.004% | 0.001% |

The refractive index was designed to be 1.51 and to have a thickness of 180 μm regardless of wavelength. The spectral transmission of the polarizing plate is illustrated in FIGS. 9 to 11.

The glass substrate was assumed to have a refractive index of 1.5 and a transmittance of 100%. The thickness of the glass substrate was designed to be 0.7 mm.

The color characteristics of the color filter layer are described in the following Table 2 and the spectral transmittance of the color filter layer is illustrated in FIGS. 12 to 15. The color filter layers were assumed to have a refractive index of 1.7 and a thickness of 1.8 μm, irrespective of wavelength.

TABLE 2

|  | Chromaticity (light source C) | | | Transmittance (%) | | |
| --- | --- | --- | --- | --- | --- | --- |
|  | x | Y | z | 450 nm | 535 nm | 630 nm |
| Red pixel | 0.650 | 0.335 | 20.1 | 0.4 | 0.1 | 94.3 |
| Green pixel | 0.275 | 0.600 | 53.7 | 0.2 | 82.3 | 0.7 |
| Green pixel (No.7) | 0.302 | 0.540 | 67.0 | 4.2 | 88.8 | 8.1 |
| Blue pixel | 0.135 | 0.102 | 11.6 | 82.4 | 8.6 | 0.1 |

Only No. 7 among the simulations which will be described later was changed in the condition of the green pixel.

The liquid crystal was assumed to have a refractive index of 1.60 in the direction of the major axis regardless of wavelength, a refractive index of 1.50 in the direction of the minor axis regardless of wavelength, an elastic constant of 13.2 pN (broadening)/6.5 pN (torsion)/18.3 pN (bending), a dielectric constant of 3.1 in the direction of the major axis and a dielectric constant of 8.3 in the direction of the minor axis. The pre-tilt angle was designed to be 89°.

The retardation layer was a uniaxial and optical anisotropic element having an in-plane retardation. As to the retardation layer, the film thickness was 1.6 μm and the transmittance was assumed to be 100% regardless of wavelength. The ratios of the birefringence when the birefringence at a wavelength of 535 nm was 1 are described together with the average refractive index at each wavelength in the following Table 3.

TABLE 3

|  | 450 nm | 535 nm | 630 nm |
| --- | --- | --- | --- |
| Average refractive Index | 1.5670 | 1.5530 | 1.5459 |
| Ratio of the birefringence | 1.0635 | 1 | 0.9571 |

The average refractive index is illustrated in FIG. 16 and the ratio of the birefringence is illustrated in FIG. 17.

This calculation deals with only the reflective area. The layer structure was designed to be a polarizing plate/glass substrate/color filter layer/retardation layer/liquid crystal layer/mirror surface reflective plate from the visual side and the thickness of the liquid crystal layer was 1.5 μm. The absorption axis of the polarizing plate was designed to have an angle of 90° and the angle of the pre-twist angle and retardation axis of the retardation layer was designed to be 45°.

The display was designed to display a black color when the voltage applied to the liquid crystal layer was 0 V and to display a white color when the voltage applied to the liquid crystal layer was 5 V to obtain each spectral transmittance in the front direction, and a C light source was used as the light source to calculate the contrast. In this case, reflection on the boundaries other than that of the mirror surface reflective plate was not taken into account.

Simulations were made in the following manner under the aforementioned conditions common to these simulations.

(No. 1)

With regard to the retardation layer having the specified characteristics as listed in the following Table 4, optical calculations were performed. The birefringence is a value at a wavelength of 550 nm. The contrast ratio was 50.

TABLE 4

|  |  | Area ratio | Birefringent index (550 nm) |
|---|---|---|---|
| Red pixel | Coloring section | 85% | 0.099 |
|  | Non-coloring section | 15% | 0.084 |
| Green pixel | Coloring section | 60% | 0.084 |
|  | Non-coloring section | 40% | 0.084 |
| Blue pixel | Coloring section | 85% | 0.074 |
|  | Non-coloring section | 15% | 0.084 |

Each reflectance in white display and black display is illustrated in FIG. 18.

(No. 2)

With regard to the retardation layer having the specified characteristics as listed in the following Table 5, optical calculations were performed. The birefringence is a value at a wavelength of 550 nm. The contrast ratio was 51.

TABLE 5

|  |  | Area ratio | Birefringent index (550 nm) |
|---|---|---|---|
| Red pixel | Coloring section | 85% | 0.099 |
|  | Non-coloring section | 15% | 0.088 |
| Green pixel | Coloring section | 60% | 0.084 |
|  | Non-coloring section | 40% | 0.084 |
| Blue pixel | Coloring section | 85% | 0.074 |
|  | Non-coloring section | 15% | 0.088 |

Each reflectance in white display and black display is illustrated in FIG. 19.

(No. 3)

With regard to the retardation layer having the specified characteristics as listed in the following Table 6, optical calculations were performed. The birefringence is a value at a wavelength of 550 nm. The contrast ratio was 52.

TABLE 6

|  |  | Area ratio | Birefringent index (550 nm) |
|---|---|---|---|
| Red pixel | Coloring section | 85% | 0.099 |
|  | Non-coloring section | 15% | 0.088 |
| Green pixel | Coloring section | 60% | 0.084 |
|  | Non-coloring section | 40% | 0.088 |
| Blue pixel | Coloring section | 85% | 0.074 |
|  | Non-coloring section | 15% | 0.088 |

Each reflectance in white display and black display is illustrated in FIG. 20.

(No. 4)

With regard to the retardation layer having the specified characteristics as listed in the following Table 7, optical calculations were performed. The birefringence is a value at a wavelength of 550 nm. The contrast ratio was 43.

TABLE 7

|  |  | Area ratio | Birefringent index (550 nm) |
|---|---|---|---|
| Red pixel | Coloring section | 75% | 0.099 |
|  | Non-coloring section | 25% | 0.084 |
| Green pixel | Coloring section | 40% | 0.084 |
|  | Non-coloring section | 60% | 0.084 |
| Blue pixel | Coloring section | 80% | 0.074 |
|  | Non-coloring section | 20% | 0.084 |

Each reflectance in white display and black display is illustrated in FIG. 21.

(No. 5)

With regard to the retardation layer having the specified characteristics as listed in the following Table 8, optical calculations were performed. The birefringence is a value at a wavelength of 550 nm. The contrast ratio was 44.

TABLE 8

|  |  | Area ratio | Birefringent index (550 nm) |
|---|---|---|---|
| Red pixel | Coloring section | 75% | 0.099 |
|  | Non-coloring section | 25% | 0.088 |
| Green pixel | Coloring section | 40% | 0.084 |
|  | Non-coloring section | 60% | 0.084 |
| Blue pixel | Coloring section | 80% | 0.074 |
|  | Non-coloring section | 20% | 0.088 |

Each reflectance in white display and black display is illustrated in FIG. 22.

(No. 6)

With regard to the retardation layer having the specified characteristics as listed in the following Table 9, optical calculations were performed. The birefringence is a value at a wavelength of 550 nm. The contrast ratio was 46.

TABLE 9

|  |  | Area ratio | Birefringent index (550 nm) |
|---|---|---|---|
| Red pixel | Coloring section | 75% | 0.099 |
|  | Non-coloring section | 25% | 0.088 |
| Green pixel | Coloring section | 40% | 0.084 |
|  | Non-coloring section | 60% | 0.088 |
| Blue pixel | Coloring section | 80% | 0.074 |
|  | Non-coloring section | 20% | 0.088 |

Each reflectance in white display and black display is illustrated in FIG. 23.

(No. 7)

With regard to the retardation layer having the specified characteristics as listed in the following Table 10, optical calculations were performed. In this retardation layer, the non-coloring section does not exist in the green pixel in this retardation layer. The birefringence is a value at a wavelength of 550 nm. The contrast ratio was 61.

TABLE 10

| | | Area ratio | Birefringent index (550 nm) |
|---|---|---|---|
| Red pixel | Coloring section | 85% | 0.099 |
| | Non-coloring section | 15% | 0.088 |
| Green pixel | Coloring section | 100% | 0.084 |
| | Non-coloring section | 0% | — |
| Blue pixel | Coloring section | 85% | 0.074 |
| | Non-coloring section | 15% | 0.088 |

Each reflectance in white display and black display is illustrated in FIG. 24.

(No. 8)

With regard to the retardation layer having the specified characteristics as listed in the following Table 11, optical calculations were performed. The birefringence is a value at a wavelength of 550 nm. The contrast ratio was 29.

TABLE 11

| | | Area ratio | Birefringent index (550 nm) |
|---|---|---|---|
| Red pixel | Coloring section | 85% | 0.099 |
| | Non-coloring section | 15% | 0.099 |
| Green pixel | Coloring section | 60% | 0.084 |
| | Non-coloring section | 40% | 0.084 |
| Blue pixel | Coloring section | 85% | 0.074 |
| | Non-coloring section | 15% | 0.074 |

Each reflectance in white display and black display is illustrated in FIG. 25.

(No. 9)

With regard to the retardation layer having the specified characteristics as listed in the following Table 12, optical calculations were performed. The birefringence is a value at a wavelength of 550 nm. The contrast ratio was 32.

TABLE 12

| | | Area ratio | Birefringent index (550 nm) |
|---|---|---|---|
| Red pixel | Coloring section | 85% | 0.084 |
| | Non-coloring section | 15% | 0.084 |
| Green pixel | Coloring section | 60% | 0.084 |
| | Non-coloring section | 40% | 0.084 |

TABLE 12-continued

| | | Area ratio | Birefringent index (550 nm) |
|---|---|---|---|
| Blue pixel | Coloring section | 85% | 0.084 |
| | Non-coloring section | 15% | 0.084 |

Each reflectance in white display and black display is illustrated in FIG. 26.

(No. 10)

With regard to the retardation layer having the specified characteristics as listed in the following Table 13, optical calculations were performed. The birefringence is a value at a wavelength of 550 nm. The contrast ratio was 24.

TABLE 13

| | | Area ratio | Birefringent index (550 nm) |
|---|---|---|---|
| Red pixel | Coloring section | 75% | 0.099 |
| | Non-coloring section | 25% | 0.099 |
| Green pixel | Coloring section | 40% | 0.084 |
| | Non-coloring section | 60% | 0.084 |
| Blue pixel | Coloring section | 80% | 0.074 |
| | Non-coloring section | 20% | 0.074 |

Each reflectance in white display and black display is illustrated in FIG. 27.

(No. 11)

With regard to the retardation layer having the specified characteristics as listed in the following Table 14, optical calculations were performed. The birefringence is a value at a wavelength of 550 nm. The contrast ratio was 32.

TABLE 14

| | | Area ratio | Birefringent index (550 nm) |
|---|---|---|---|
| Red pixel | Coloring section | 75% | 0.084 |
| | Non-coloring section | 25% | 0.084 |
| Green pixel | Coloring section | 40% | 0.084 |
| | Non-coloring section | 60% | 0.084 |
| Blue pixel | Coloring section | 80% | 0.084 |
| | Non-coloring section | 20% | 0.084 |

Each reflectance in white display is illustrated in FIG. 28.

The contrast ratio of each retardation layer is described together with the ratio of pixels and the birefringence in Table 15 below.

TABLE 15

| No. | | Area ratio | | | Birefringent index | | | Contrast ratio |
|---|---|---|---|---|---|---|---|---|
| | | Red pixel | Green pixel | Blue pixel | Red pixel | Green pixel | Blue pixel | |
| 1 | Color section | 85% | 60% | 85% | 0.099 | 0.084 | 0.074 | 50 |
| | Non-color section | 15% | 40% | 15% | 0.084 | 0.084 | 0.084 | |
| 2 | Color section | 85% | 60% | 85% | 0.099 | 0.084 | 0.074 | 51 |
| | Non-color section | 15% | 40% | 15% | 0.088 | 0.084 | 0.088 | |
| 3 | Color section | 85% | 60% | 85% | 0.099 | 0.084 | 0.074 | 52 |
| | Non-color section | 15% | 40% | 15% | 0.088 | 0.088 | 0.088 | |
| 4 | Color section | 75% | 40% | 80% | 0.099 | 0.084 | 0.074 | 43 |
| | Non-color section | 25% | 60% | 20% | 0.084 | 0.084 | 0.084 | |

TABLE 15-continued

| No. | | Area ratio | | | Birefringent index | | | Contrast ratio |
|---|---|---|---|---|---|---|---|---|
| | | Red pixel | Green pixel | Blue pixel | Red pixel | Green pixel | Blue pixel | |
| 5 | Color section | 75% | 40% | 80% | 0.099 | 0.084 | 0.074 | 44 |
| | Non-color section | 25% | 60% | 20% | 0.088 | 0.084 | 0.088 | |
| 6 | Color section | 75% | 40% | 80% | 0.099 | 0.084 | 0.074 | 46 |
| | Non-color section | 25% | 60% | 20% | 0.088 | 0.088 | 0.088 | |
| 7 | Color section | 75% | 100% | 80% | 0.099 | 0.084 | 0.074 | 61 |
| | Non-color section | 25% | 0% | 20% | 0.088 | — | 0.088 | |
| 8 | Color section | 85% | 60% | 85% | 0.099 | 0.084 | 0.074 | 29 |
| | Non-color section | 15% | 40% | 15% | 0.099 | 0.084 | 0.074 | |
| 9 | Color section | 85% | 60% | 85% | 0.084 | 0.084 | 0.084 | 32 |
| | Non-color section | 15% | 40% | 15% | 0.084 | 0.084 | 0.084 | |
| 10 | Color section | 75% | 40% | 80% | 0.099 | 0.084 | 0.074 | 24 |
| | Non-color section | 25% | 60% | 20% | 0.099 | 0.084 | 0.074 | |
| 11 | Color section | 75% | 40% | 80% | 0.084 | 0.084 | 0.084 | 32 |
| | Non-color section | 25% | 60% | 20% | 0.084 | 0.084 | 0.084 | |

Nos. 1 to 7 correspond to Examples, because the birefringence of the region of the retardation layer corresponding to the non-coloring section is set to a value different from that of the coloring section. In, for example, Nos. 1 to 4, the birefringence of the region of the retardation layer corresponding to the non-coloring section is set to the same birefringence as that of the region corresponding to the coloring section of the green pixel. In Nos. 2, 3, 5 and 6, the birefringence of the region of the retardation layer corresponding to the non-coloring section is set to an appropriate value which is lower than that of the region corresponding to the coloring section of the red pixel and higher than that of the region corresponding to the coloring section of the blue pixel. As a result, a reflective display with a contrast ratio as high as 43 or more was obtained.

Only the green pixel of No. 7 has a structure provided with no non-coloring section by raising the transmittance of the color filter layer in the reflective display area. In this case, the contrast ratio in the reflective display is raised up to 61.

In Nos. 8 to 11, on the other hand, the birefringence of the region of the retardation layer corresponding to the non-coloring section is set to the same value as that of the coloring section. Therefore, the contrast ratio in the reflective display is 32 at most.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A retardation substrate comprising:
   a substrate;
   an optically anisotropic solidified liquid crystal layer which is supported by the substrate and formed as a continuous film made from a same material; and
   a color filter layer interposed between the substrate and the solidified liquid crystal layer or facing the substrate with the solidified liquid crystal layer interposed therebetween,
   wherein the color filter layer comprises first to third coloring pixels different in the wavelength of transmitted light, the first to third coloring pixels are each constituted by a reflective display area and a transmissive display area,
   the reflective display areas of the coloring pixels are each constituted by a coloring section and a non-coloring section,
   the solidified liquid crystal layer comprises first to third regions respectively facing the reflective display areas of each coloring pixels, the first to third regions each constituted by a sub-region A and a sub-region B respectively facing the coloring section and the non-coloring section of the reflective display area,
   an in-plane birefringence of the 1A sub-region is larger than that of the 2A subregion, an in-plane birefringence of the 3A sub-region is smaller than that of the 2A subregion, and
   an in-plane birefringence of the 1B sub-region is the same as that of the 3B sub-region, smaller than that of the 1A sub-region and larger than that of the 3A sub-region.

2. The retardation substrate according to claim 1, wherein the 1B sub-region, the 2B sub-region and the 3B sub-region have the same in-plane birefringence.

3. The retardation substrate according to claim 2, wherein the 1B sub-region, the 2B sub-region and the 3B sub-region each have the same in-plane birefringence as that of the 2A-sub region.

4. The retardation substrate according to claim 1, wherein the solidified liquid crystal layer has a uniform thickness over the entire surface thereof.

5. The retardation substrate according to claim 1, wherein the solidified liquid crystal layer is formed by polymerizing and/or crosslinking a thermotropic liquid crystal compound or composition.

6. The retardation substrate according to claim 1, wherein the first coloring pixel primarily transmits light having a longer wavelength and the third coloring pixel primarily transmits light having a shorter wavelength than the second coloring pixel.

7. The retardation substrate according to claim 1, wherein spectral transmittances of the coloring sections in the reflective display areas of the first to third coloring pixels are the same as spectral transmittances of the transmissive display areas of the first to third coloring pixels, respectively.

8. A semi-transparent liquid crystal display comprising the retardation substrate according to claim 1.

9. A method for manufacturing a retardation substrate, comprising forming a solidified liquid crystal layer on a substrate having a color filter layer formed thereon, wherein the color filter layer comprises first to third coloring pixels different in the wavelength of transmitted light, the first to third coloring pixels are each constituted by a reflective display area and a transmissive display area, the reflective display areas of the coloring pixels are each constituted by a coloring section and a non-coloring section, forming the solidified liquid crystal layer comprising:

a film-forming step of forming a liquid crystal material layer directly on the color filter layer or with another layer interposed therebetween, the liquid crystal material layer comprising a photo-polymerizing or photo-crosslinking thermotropic liquid crystal compound, mesogens of the thermotropic liquid crystal compound forming an orientated structure;

an exposure step of exposing at least two regions of the liquid crystal material layer to light at different exposure values to form a 1A sub-region facing the coloring section of the reflective display area of the first coloring pixel and comprising a polymerization or crosslinkage product of the thermotropic liquid crystal compound, a 2A sub-region facing the coloring section of the reflective display area of the second coloring pixel and comprising the polymerization or crosslinkage product and the thermotropic liquid crystal compound as an unreacted compound, wherein a polymerization or crosslinkage product content of the 2A sub-region is lower than that of the 1A sub-region, a 3A sub-region facing the coloring section of the reflective display area of the third coloring pixel and comprising the unreacted compound., wherein a polymerization or crosslinkage product content of the 3A sub-region is lower than that of the 2A sub-region, and 1B to 3B sub-regions comprising the unreacted compound, wherein polymerization or crosslinkage product contents of the 1B to 3B sub-regions are lower than that of the 1A sub-region and higher than that of the 3A sub-region, the 1B to 3B sub-regions respectively facing the non-coloring section of the reflective display area of the first to third coloring pixels;

thereafter, a developing step of heating the liquid crystal material layer to a temperature equal to or higher than a phase transition temperature at which the thermotropic liquid crystal compound changes from a liquid crystal phase to an isotropic phase to lower degree of orientation of the mesogens in at least the 2A, 3A, and 1B to 3B sub-regions; and a fixing step of polymerizing and/or crosslinking the unreacted compound while maintaining a low level of orientation.

10. The manufacturing method according to claim 9, wherein the exposure step is performed such that the polymerization or crosslinkage product contents of the 1B to 3B sub-regions are the same.

11. The manufacturing method according to claim 10, wherein the exposure step is performed such that the polymerization or crosslinkage product contents of the 1B to 3B sub-regions are the same as that of the 2A sub-region.

12. The manufacturing method according to claim 9, wherein the exposure step is performed such that the polymerization or crosslinkage product content of the 1B sub-region is the same as that of the 3B sub-region and different from that of the 2B sub-region and the polymerization or crosslinkage product content of the 2B sub-region is the same as that of the 2A sub-region.

13. The manufacturing method according to claim 9, wherein in the film forming step, the liquid crystal material layer is formed as a continuous film having a uniform thickness.

14. The manufacturing method according to claim 9, wherein in the fixing step, the polymerization and/or crosslinking reaction is induced by irradiation with light.

15. The manufacturing method according to claim 14, wherein the irradiation with light in the fixing step is performed by exposing the entire surface of the liquid crystal material layer.

16. The manufacturing method according to claim 9, wherein the thermotropic liquid crystal compound is a material that causes polymerization and/or crosslinking when heated at a polymerization and/or crosslinking temperature higher than the phase transition temperature, a state of the orientation of the mesogenic group is changed by heating the liquid crystal material layer to a temperature lower than the polymerization and/or crosslinking temperature in the developing step and the unpolymerized and uncrosslinked thermotropic liquid crystal compound are polymerized and/or crosslinked by heating the liquid crystal material layer to a temperature equal to or higher than the polymerization and/or crosslinking temperature in the fixing step.

17. A method for manufacturing a retardation substrate, comprising forming a solidified liquid crystal layer on a substrate and forming a color filter layer directly on the solidified liquid crystal layer or with another layer interposed therebetween, forming the solidified liquid crystal layer comprising:

a film-forming step of forming a liquid crystal material layer directly on the substrate or with another layer interposed therebetween, the liquid crystal material layer comprising a photo-polymerizing or photo-crosslinking thermotropic liquid crystal compound, mesogens of the thermotropic liquid crystal compound forming an orientated structure;

an exposure step of exposing at least two regions of the liquid crystal material layer to light at different exposure values to form a 1A sub-region comprising a polymerization or crosslinkage product of the thermotropic liquid crystal compound, a 2A sub-region comprising the polymerization or crosslinkage product and the thermotropic liquid crystal compound as an unreacted compound, wherein a polymerization or crosslinkage product content of the 2A sub-region is lower than that of the 1A sub-region, a 3A sub-region comprising the unreacted compound, wherein a polymerization or crosslinkage product content of the 3A sub-region is lower than that of the 2A sub-region, and 1B to 3B sub-regions comprising the unreacted compound, wherein polymerization or crosslinkage product contents of the 1B to 3B sub-regions are lower than that of the 1A sub-region and higher than that of the 3A sub-region;

thereafter, a developing step of heating the liquid crystal material layer to a temperature equal to or higher than a phase transition temperature at which the thermotropic liquid crystal compound changes from a liquid crystal phase to an isotropic phase to lower degree of orientation of the mesogens in at least the 2A, 3A, and 1B to 3B sub-regions; and a fixing step of polymerizing and/or crosslinking the unreacted compound while maintaining a low level of orientation, forming the color filter layer comprising:

providing first to third coloring pixels different in the wavelength of transmitted light, the first to third coloring pixels are each constituted by a reflective display area and a transmissive display area;

the reflective display areas of the first to third coloring pixels are each constituted by a coloring section respectively facing the 1A to 3A sub-regions and a non-coloring section respectively facing the 1B to 3B sub-regions.

18. The manufacturing method according to claim 17, wherein the exposure step is performed such that the polymerization or crosslinkage product contents of the 1B to 3B sub-regions are the same.

19. The manufacturing method according to claim 18, wherein the exposure step is performed such that the polymerization or crosslinkage product contents of the 1B to 3B sub-regions are the same as that of the 2A sub-region.

20. The manufacturing method according to claim 17, wherein the exposure step is performed such that the polymerization or crosslinkage product content of the 1B sub-region is the same as that of the 3B sub-region and different from that of the 2B sub-region and the polymerization or crosslinkage product content of the 2B sub-region is the same as that of the 2A sub-region.

21. The manufacturing method according to claim 17, wherein in the film forming step, the liquid crystal material layer is formed as a continuous film having a uniform thickness.

22. The manufacturing method according to claim 17, wherein in the fixing step, the polymerization and/or crosslinking reaction is induced by irradiation with light.

23. The manufacturing method according to claim 22, wherein the irradiation with light in the fixing step is performed by exposing the entire surface of the liquid crystal material layer.

24. The manufacturing method according to claim 17, wherein the thermotropic liquid crystal compound is a material that causes polymerization and/or crosslinking when heated at a polymerization and/or crosslinking temperature higher than the phase transition temperature, a state of the orientation of the mesogenic group is changed by heating the liquid crystal material layer to a temperature lower than the polymerization and/or crosslinking temperature in the developing step and the unpolymerized and uncrosslinked thermotropic liquid crystal compound are polymerized and/or crosslinked by heating the liquid crystal material layer to a temperature equal to or higher than the polymerization and/or crosslinking temperature in the fixing step.

* * * * *

UNITED STATES PATENT AND TRADEMARK OFFICE
CERTIFICATE OF CORRECTION

PATENT NO. : 7,948,590 B2
APPLICATION NO. : 12/923617
DATED : May 24, 2011
INVENTOR(S) : Akao et al.

It is certified that error appears in the above-identified patent and that said Letters Patent is hereby corrected as shown below:

Column 26, Line 45, In Claim 3, delete "2A-sub region." and insert -- 2A sub region. --, therefor.

Column 27, Line 32 (Approx.), In Claim 9, delete "compound.," and insert -- compound, --, therefor.

Signed and Sealed this
Twenty-seventh Day of September, 2011

David J. Kappos
*Director of the United States Patent and Trademark Office*